(12) United States Patent
Sugioka et al.

(10) Patent No.: US 7,754,984 B2
(45) Date of Patent: Jul. 13, 2010

(54) TRANSPORTATION DEVICE AND COMBINATIONAL WEIGHING APPARATUS INCLUDING THE SAME

(75) Inventors: Yukio Sugioka, Ritto (JP); Hiroshi Hattori, Ritto (JP); Masaya Fujii, Ritto (JP); Takuya Iwasa, Ritto (JP); Takuyu Kubo, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 664 days.

(21) Appl. No.: 11/574,579

(22) PCT Filed: Jan. 17, 2006

(86) PCT No.: PCT/JP2006/000534

§ 371 (c)(1),
(2), (4) Date: Mar. 1, 2007

(87) PCT Pub. No.: WO2006/077831

PCT Pub. Date: Jul. 27, 2006

(65) Prior Publication Data

US 2009/0229890 A1    Sep. 17, 2009

(30) Foreign Application Priority Data

Jan. 20, 2005   (JP)   ............................. 2005-012396
Mar. 29, 2005   (JP)   ............................. 2005-094370

(51) Int. Cl.
*G01G 13/02*   (2006.01)
*B65G 27/08*   (2006.01)

(52) U.S. Cl. ....................... 177/119; 198/755; 198/763; 198/764; 198/766

(58) Field of Classification Search .............. 177/25.18, 177/119; 198/755, 766, 763, 764
See application file for complete search history.

(56) References Cited

U.S. PATENT DOCUMENTS

| | | | |
|---|---|---|---|
| 3,253,700 A | | 5/1966 | Allen et al. |
| 3,305,067 A | * | 2/1967 | Mayer ........................ 198/383 |
| 3,581,871 A | * | 6/1971 | Forman ....................... 222/55 |
| 3,817,370 A | * | 6/1974 | Cox ........................... 198/579 |
| 3,835,983 A | * | 9/1974 | Horii .......................... 198/446 |
| 4,088,223 A | * | 5/1978 | Bertrand ..................... 198/761 |
| 4,243,132 A | * | 1/1981 | Miyakoshi et al. ............ 193/40 |
| 4,505,380 A | * | 3/1985 | McLemore et al. ...... 198/750.7 |
| 4,593,603 A | * | 6/1986 | Johnson ....................... 91/265 |
| 4,596,327 A | * | 6/1986 | Yamano ..................... 198/533 |

(Continued)

FOREIGN PATENT DOCUMENTS

EP            0 677 460 A2       4/1995

(Continued)

*Primary Examiner*—Randy W Gibson
(74) *Attorney, Agent, or Firm*—Global IP Counselors, LLP

(57) ABSTRACT

A transportation device capable of smoothly transporting even an object having a sticky surface or the like and a weighing device including the same are provided. A transportation device is for transporting an object placed on a trough in a predetermined direction by reciprocating the trough by a parallel link mechanism, and a control unit controls the rotation driving of a rotatable motor such that the trough moves forward with respect to the transportation direction at a higher velocity than backward.

15 Claims, 27 Drawing Sheets

U.S. PATENT DOCUMENTS

| | | | | |
|---|---|---|---|---|
| 4,600,096 | A * | 7/1986 | Yamano et al. | 198/533 |
| 4,795,025 | A * | 1/1989 | Doke et al. | 198/763 |
| 5,467,859 | A * | 11/1995 | Sahlberg | 198/750.7 |
| 5,646,374 | A * | 7/1997 | Stapp et al. | 177/25.18 |
| 5,767,455 | A * | 6/1998 | Mosher | 177/64 |
| 5,773,765 | A * | 6/1998 | Sashiki et al. | 177/25.18 |
| 5,850,906 | A * | 12/1998 | Dean | 198/750.8 |
| 6,041,915 | A * | 3/2000 | Fishman et al. | 198/766 |
| 6,189,683 | B1 * | 2/2001 | Svejkovsky et al. | 198/769 |
| 6,235,998 | B1 * | 5/2001 | Brewer | 177/103 |
| 6,257,395 | B1 * | 7/2001 | Yokajty et al. | 198/580 |
| 6,357,579 | B1 * | 3/2002 | Patterson et al. | 198/766 |
| 6,417,464 | B2 * | 7/2002 | Steele | 177/105 |
| 6,527,104 | B2 * | 3/2003 | Svejkovsky et al. | 198/769 |
| 7,216,757 | B1 * | 5/2007 | Patterson et al. | 198/750.8 |
| 7,439,454 | B2 * | 10/2008 | Komatsu et al. | 177/25.18 |

FOREIGN PATENT DOCUMENTS

| | | |
|---|---|---|
| JP | S57-77215 U | 5/1982 |
| JP | S58-197112 A | 11/1983 |
| JP | H03-3812 A | 1/1991 |
| JP | H05-3217 U | 1/1993 |
| JP | 2000-247427 A | 9/2000 |

* cited by examiner

Forward with respect to the transportation direction

Forward with respect to the transportation direction →

| Trough transportation surface: horizontal | Intermittent driving control | 500pps → 1500pps (FF) | 1500pps → 500pps (FB) | 500pps → 1000pps (FF) | 1000pps → 500pps (FB) |
|---|---|---|---|---|---|
| | | -6.2 | 23.1 | 3.3 | 8.2 |
| | | ↓ | →→→ | → | → |

Unit: mm/s

Fig. 11

| Trough: horizontal (with no projections) | | 1000pps → 500pps (FF) | 1500pps → 500pps (FF) | 1500pps → 800pps (FF) | 1500pps → 1000pps (FF) |
|---|---|---|---|---|---|
| | Intermittent | — | 11.6 | 7.2 | 7.9 |
| | Continuous | 9.0 | 6.8 | 8.2 | 8.4 |

Unit: s

*Fig. 12*

|  | | 1500pps → 500pps (FF)<br>Trough: horizontal driving | 1500pps → 500pps (FF)<br>Trough: throw-upward driving |
|---|---|---|---|
| Trough: horizontal;<br>intermittent<br>driving control | Without projections | 11.6 | 8.2 |
| | With projections | 4.7 | 3.5 |

Unit: s

*Fig. 13*

| | | Trough: flat (without projections) 1500pps → 500pps (FF) | Trough: with projections 1500pps → 500pps (FF) |
|---|---|---|---|
| Trough: intermittent driving control; flat (no projections) | Horizontal driving control | 11.6 | 4.7 |
| | Throw-upward driving control | 8.2 | 3.5 |

Unit: s

| Object weight | Inclination | Rotation rate fulfilling the specifications |
|---|---|---|
| 1500 | Flat | 450 |
| 1500 | 7° | 350 |
| 1500 | 13° | 250 |

TRANSPORTATION DEVICE AND COMBINATIONAL WEIGHING APPARATUS INCLUDING THE SAME

TECHNICAL FIELD

The present invention relates to a transportation device for transporting an object placed on a trough in a predetermined transportation direction by reciprocating the trough, and a combinational weighing device including the same.

BACKGROUND ART

Conventionally, transportation devices for transporting an object placed on a trough have been provided. An example of such a transportation device reciprocates a trough with respect to a transportation direction by means of a parallel link mechanism (reciprocating mechanism) that is connected to the trough.

For example, a transportation device disclosed in Japan Published Patent Publication No. 2000-247427 (published on Sep. 12, 2000) adopts a transportation system which moves a trough backward with respect to the transportation direction at a higher velocity than forward. This transportation device can reciprocate the trough in a transportation direction by rotating a motor connected to the parallel link mechanism in a forward direction.

DISCLOSURE OF INVENTION

However, the above-described conventional transportation device has the following problems.

The above-described transportation device transports an object on the trough forward with respect to the transportation direction by using a transportation system which moves the trough backward with respect to the transportation direction at a higher velocity than when moving it forward. However, an object having a sticky surface, an object that absorbs vibration, an object containing a significant amount of moisture or the like, for example, chicken meat or pickles (or food preserved in vinegar, brine, etc.), may occasionally not be smoothly transported forward with respect to the transportation direction.

In addition, the transportation device disclosed in the above-mentioned publication transports an object on the trough forward with respect to the transportation direction by means of a "fast backward" transportation system. However, for example, an object having a sticky surface or an object which is soft and absorbs vibration, such as chicken meat, pickles or the like, may occasionally not be smoothly transported forward with respect to the transportation direction.

An object of the present invention is to provide a transportation device that is capable of smoothly transporting an object, even an object having a sticky surface and the like, and a combinational weighing device including the same.

A transportation device according to a first aspect comprises a trough, a reciprocating mechanism, and a control unit. An object to be transported is placed on the trough. The reciprocating mechanism reciprocates the trough in the transportation direction of the object. The control unit controls the reciprocating mechanism so as to move the trough forward with respect to the transportation direction at a higher velocity than backward. The trough is reciprocated forward in a diagonally upward direction by means of the reciprocating mechanism.

Here, with the transportation device for transporting an object placed on the trough in a predetermined direction by reciprocating the trough in the transportation direction, a reciprocating mechanism for reciprocating the trough, such as, for example, a parallel link mechanism, is controlled to move the trough forward with respect to the transportation direction at a higher velocity than backward.

Thus, even an object having a sticky surface or an object that absorbs vibration, such as, for example, chicken meat or pickles can be smoothly transported in the predetermined transportation direction.

In a transportation device according to a second aspect based on the first aspect, the reciprocating mechanism is a parallel link mechanism including comprising a plurality of vertical members for supporting the trough, a drive source for reciprocating the trough, and a link member for coupling vertical members and the drive source.

Here, as a mechanism for reciprocating the trough, a parallel link mechanism including vertical members for supporting the trough, a drive source, and a link member is used.

Thus, a driving force supplied from the drive source to the link member is conveyed to the vertical members, and the vertical members swing forward and backward in the transportation direction. As a result, the trough can be reciprocated forward and backward with respect to the transportation direction.

In a transportation device according to a third aspect based on the second aspect, the parallel link mechanism is installed to the rear of the trough in the transportation direction of the object.

In a transportation device according to a fourth aspect based on any one of the first through third aspects, the control unit controls the reciprocating mechanism such that the trough reciprocates forward and backward with respect to the transportation direction intermittently to move each time the trough reciprocates forward and backward with respect to the transportation direction and such that the trough will be stationary in a rear end area with respect to transportation direction.

Here, intermittent control is performed such that the trough stops after each reciprocation and will be stationary in a rear end area with respect to transportation direction.

Thus, a static friction force generated between the object and the trough by each reciprocation of the trough is recovered. As a result, when, for example, an object having a high viscosity is being transported, the viscous resistance is increased and the force in which the object is thrown upward increases. Therefore, the situation in which the object slides on the trough while the trough is reciprocating and cannot be properly transported can be prevented.

A transportation device according to a fifth aspect based on any one of the first through fourth aspects further comprises a projection formed on a transportation surface of the trough, wherein a face of the projection located at a forward position with respect to the transportation direction is inclined at a greater angle to the transportation surface than a face of the projection located at a backward position with respect to the transportation direction.

Here, on the transportation surface of the trough on which the object for transportation is to be placed, a projection is provided for properly transporting the object forward with respect to the transportation direction while the trough is reciprocating. The projection has, for example, a generally triangular cross-section when seen from the side of the trough, and is formed such that a face thereof located at a forward position with respect to the transportation direction is inclined at a greater angle to the transportation surface than a face thereof located at a backward position with respect to the transportation direction.

Thus, the face of the projection having a greater inclination angle can prevent the object from being displaced backward with respect to the transportation direction while the trough is reciprocating. As a result, smooth transportation of the object placed on the trough can be realized.

In a transportation device according to a sixth aspect based on any one of the first through fifth aspects, the transportation surface of the trough is inclined down and forward with respect to the transportation direction.

Here, the trough for transporting the object to be transported is inclined down and forward with respect to the transportation direction.

Thus, even an object, which is difficult to be transported by a conventional transportation mechanism of moving the trough backward with respect to the transportation direction at a higher velocity than forward, can be transported forward with respect to the predetermined transportation direction efficiently.

By combining the downward inclination of the trough and the projection formed on the transportation surface of the trough, more efficient transportation is realized with the projection preventing the object from sliding down on the transportation surface of the trough.

In a transportation device according to a seventh aspect based on any one of the first through sixth aspects, the object to be transported is an object having a sticky surface or an object absorbing vibration.

Here, as an object to be transported by a transportation device according to the present aspect, an object having a sticky surface or an object absorbing vibration is used.

Thus, even an object having a sticky surface or absorbing vibration, such as chicken meat or pickles, which is difficult to be transported by a conventional transportation mechanism of moving the trough backward with respect to the transportation direction at a higher velocity than forward, can be transported in the predetermined transportation direction efficiently.

A combinational weighing device according to an eighth aspect comprises a transportation device according to any one of the first through seventh aspects, a weighing unit for weighing an object supplied from the transportation device, and a discharging unit for discharging the weighed object.

Here, in the combinational weighing device, the above-described transportation device is used as a supply unit for supplying an object to the weighing unit. Thus, a combinational weighing device capable of smoothly transporting an object to the weighing unit can be provided.

In a transportation device according to a ninth aspect based on any one of the first through seventh aspects, the transportation surface of the trough is inclined down and forward with respect to the transportation direction. The transportation device further comprises a driving unit for driving the reciprocating mechanism; and a projection formed on the transportation surface of the trough, wherein a face of the projection located at a forward position with respect to the transportation direction is inclined at a greater angle to the transportation surface than a face of the projection located at a backward position with respect to the transportation direction.

Here, in the transportation device for transporting an object placed on the trough by swinging by the reciprocation mechanism in a predetermined direction, the trough has a projection formed on the transportation surface thereof, and a face of the projection located at a forward position with respect to the transportation direction is inclined at a greater angle to the transportation surface than a face of the projection located at a backward position with respect to the transportation direction.

In a transportation device for transporting an object in a predetermined direction by swinging the trough forward and backward with respect to the transportation direction, the following is necessary in order to supply objects at a certain transportation amount. In addition to realizing smooth transportation in the forward transportation direction, unintended high velocity transportation caused when, for example, the object slides down on the trough needs to be prevented.

Under such circumstances, in a transportation device according to the present aspect, the transportation surface of the trough is inclined down and forward with respect to the transportation direction, and also a projection having two faces respectively formed at a forward position and a backward position with respect to the transportation direction is provided on the transportation surface of the trough.

Thus, the object can be smoothly transported forward with respect to the transportation direction by the downward inclination of the trough directed forward with respect to the transportation direction and the swinging of the trough provided by the driving of the reciprocating mechanism. The face of the projection having a greater inclination angle can prevent the object from being displaced backward with respect to the transportation direction while the trough is being swung. In addition, the face of the projection having a smaller inclination angle can prevent the object from sliding down and forward with respect to the transportation direction, which would be caused due to the downward inclination of the transportation surface of the trough directed forward with respect to the transportation direction. As a result, smooth transportation of the object can be realized, and also unintended high velocity transportation caused by the sliding-down of the object can be prevented.

By combining the above-described structure and the control by the reciprocating mechanism for reciprocating the trough to move the trough forward with respect to the transportation direction at a higher velocity than backward, an object such as a sticky object can be transported more efficiently in a desired transportation direction.

In a transportation device according to a tenth aspect based on the ninth aspect, the reciprocating mechanism has a vertical member for supporting the trough. The vertical member reciprocates in a range between a first state in which the vertical member is parallel to the vertical direction and a second state in which the vertical member is inclined backward with respect to the transportation direction.

Here, the vertical member, included in the reciprocating mechanism for swinging the trough forward and backward with respect to the transportation direction while supporting the trough, reciprocates in a range including between a first state in which the vertical member is parallel to the vertical direction and a second state in which the vertical member is inclined backward with respect to the transportation direction.

Thus, the object placed on the trough is supplied with a force of throwing the object upward obliquely forward with respect to the transportation direction. Therefore, a sticky object, for example, which is difficult to be slid on the transportation surface, can be smoothly transported in the predetermined direction.

A transportation device according to an eleventh aspect based on any one of the ninth through tenth aspects further comprises a generally circular dispersion table located upstream with respect to the trough and swung so as to disperse objects placed thereon from a center thereof, and a driving mechanism for swinging the dispersion table.

Here, a dispersion unit for dispersing objects by swinging the generally circular dispersion table having the objects placed thereon is provided upstream with respect to the trough.

Thus, by transporting objects to a plurality of troughs located around the generally circular dispersion table, the objects placed on the dispersion table can be transported in the directions of 360 degrees.

In a transportation device according to a twelfth aspect based on the eleventh aspect, the dispersion table has a projection formed on a circumferential end area of a surface thereof on which the objects are to be placed, wherein a face of the projection located at a forward position with respect to a transportation direction on the dispersion table is inclined at a greater angle to the transportation surface than a face of the projection located at a backward position with respect to the transportation direction.

Here, the objects are smoothly transported in the predetermined direction by the projection formed on a surface of the dispersion table on which the objects are to be placed.

Thus, the objects are prevented from being moved backward with respect to the transportation direction by the face of the projection located at a forward position with respect to the transportation direction while the dispersion table is swinging, and the objects are allowed to be transported at an appropriate velocity by the face of the projection located at a backward position with respect to the transportation direction.

In a transportation device according to a thirteenth aspect based on the eleventh or twelfth aspect, the dispersion table is swung in a horizontal direction by the driving mechanism.

Here, the dispersion table located upstream with respect to the trough is swung in a horizontal direction.

Thus, the objects can be smoothly transported to the troughs.

A transportation device according to a fourteenth aspect based on any one of the eleventh through thirteenth aspects further comprises a shutter mechanism, located between a circumference end of the dispersion table and the trough, for temporarily stopping transportation of the object.

Here, the shutter mechanism for inhibiting or permitting transportation of the objects is provided between the dispersion table and the trough to which the objects are supplied from the dispersion table.

Thus, in the case where a plurality of troughs are located around the dispersion table, a predetermined number of objects can be supplied to each trough (for example, one for each trough) by switching the shutter to be opened or closed by the shutter mechanism.

A combinational weighing device according to a fifteenth aspect comprises a transportation device according to any one of the ninth through fourteenth aspects; a weighing unit for weighing an object supplied from the transportation device; and a discharging unit for discharging the weighed object.

Here, in the combinational weighing device, the above-described transportation device is used as a supply unit for supplying an object to the weighing unit.

Thus, a combinational weighing device capable of smoothly transporting an object to the weighing unit and also capable of preventing unintended high velocity transportation caused by the sliding-down of the object on the transportation surface of the trough can be provided.

A transportation device according to the present invention includes a trough, a reciprocating mechanism, a driving unit, and a projection. The trough places an object to be transported thereon, and has a transportation surface inclined down and forward with respect to the transportation direction. The reciprocating mechanism swings the trough. The driving unit drives the reciprocating mechanism. The projection is formed on the transportation surface of the trough, and a face thereof located at a forward position with respect to the transportation direction is inclined at a greater angle to the transportation surface than a face thereof located at a backward position with respect to the transportation direction.

Here, in the transportation device for transporting an object placed on the trough in a predetermined direction by swinging the trough by the reciprocating mechanism, the projection is formed, on which a face located at a forward position with respect to the transportation direction is inclined at a greater angle to the transportation surface than a face located at a backward position with respect to the transportation direction.

In a transportation device for transporting an object in a predetermined direction by swinging the trough forward and backward with respect to the transportation direction in this manner, the following is necessary in order to supply objects at a certain transportation amount. In addition to realizing smooth transportation in the forward transportation direction, unintended high velocity transportation caused when, for example, the object slides down on the trough needs to be prevented.

Under such circumstances, in a transportation device according to the present invention, the transportation surface of the trough is inclined down and forward with respect to the transportation direction, and also a projection having two faces respectively located at a forward position and a backward position with respect to the transportation direction is provided on the transportation surface of the trough.

Thus, the object can be smoothly transported forward with respect to the transportation direction by the downward inclination of the trough directed forward with respect to the transportation direction and the swinging of the trough provided by the driving of the reciprocating mechanism. The face of the projection having a greater inclination angle can prevent the object from being displaced backward with respect to the transportation direction while the trough is being swung. In addition, the face of the projection having a smaller inclination angle can prevent the object from sliding down and forward with respect to the transportation direction, which would be caused due to the downward inclination of the transportation surface of the trough directed forward with respect to the transportation direction. As a result, smooth transportation of the object can be realized, and also unintended high velocity transportation caused by the sliding-down of the object can be prevented.

BRIEF DESCRIPTION OF THE DRAWINGS

FIG. 11 is a graph illustrating confirmation test results showing the transportation performance of the transportation devices according to the present invention.

FIG. 12 is a graph illustrating confirmation test results showing the transportation performance of the transportation devices according to the present invention.

FIG. 13 is a graph illustrating confirmation test results showing the transportation performance of the transportation devices according to the present invention.

FIG. 14 is a graph illustrating confirmation test results showing the transportation performance of the transportation devices according to the present invention.

FIG. 27 is a graph illustrating confirmation test results showing the transportation performance of the transportation devices according to the present invention.

BEST MODE FOR CARRYING OUT THE INVENTION

Embodiment 1

A transportation device according to one embodiment of the present invention will be described with reference to FIG. 1 through FIG. 4.

Overall Structure of Transportation Device 10

Figure 1:
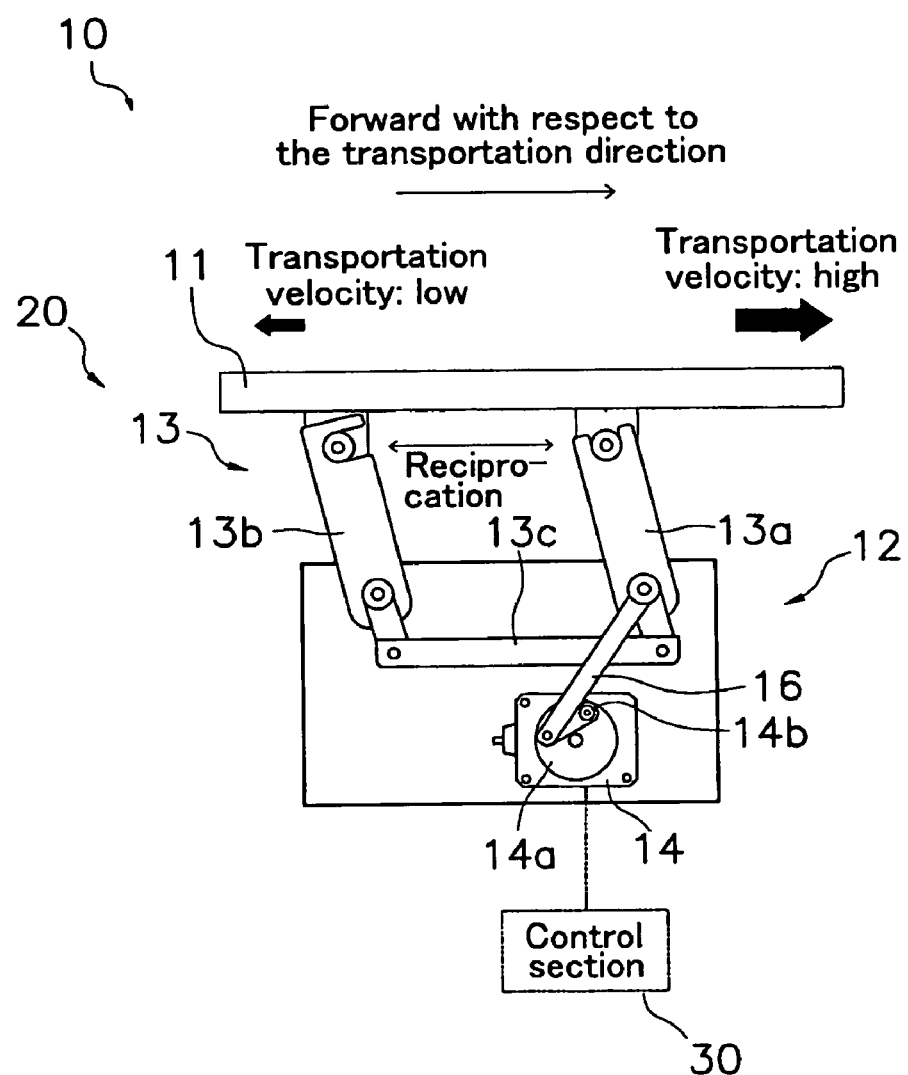
FIG. 1 is a lateral cross-sectional view of a transportation device according to Embodiment 1 of the present invention.

A transportation device 10 according to one embodiment of the present invention is for transporting an object placed on a trough 11 in a predetermined transportation direction. As shown in FIG. 1, the transportation device 10 includes the trough 11, a parallel link mechanism (reciprocating mechanism) 20, and a control unit 30. With the transportation device 10, an object is transported by reciprocating the trough 11 with respect to the transportation direction by means of the parallel link mechanism 20. Also with the transportation device 10, the control unit 30 controls the trough 11 to reciprocate intermittently with respect to the transportation direction after each reciprocation and to move forward with respect to the transportation direction at a higher velocity than backward with respect to the transportation direction. The control unit 30 is connected to a rotatable motor 14 described below, and controls the rotation driving by the motor 14 and also controls the entirety of the transportation device 10.

Trough 11

Figure 2A:
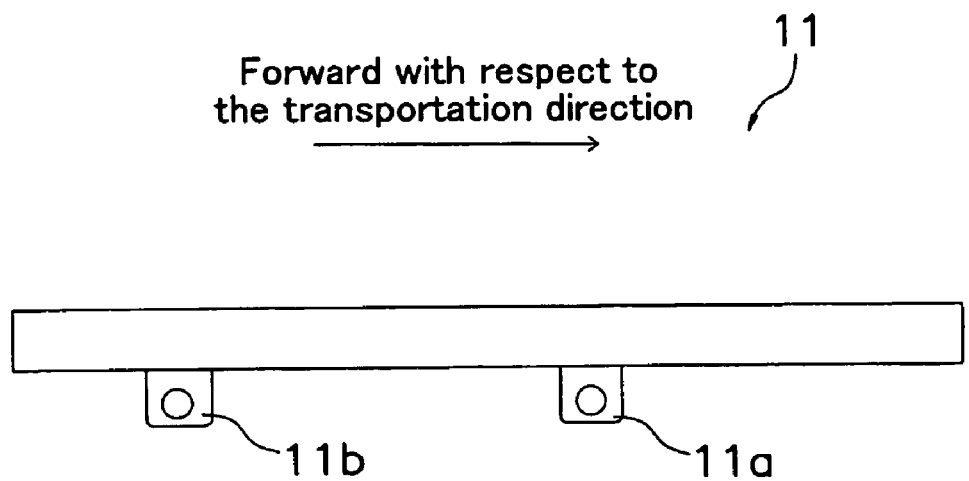
FIG. 2A and FIG. 2B are respectively a lateral cross-sectional view and a plan view of a trough included in the transportation device shown in FIG. 1.
Figure 2B:
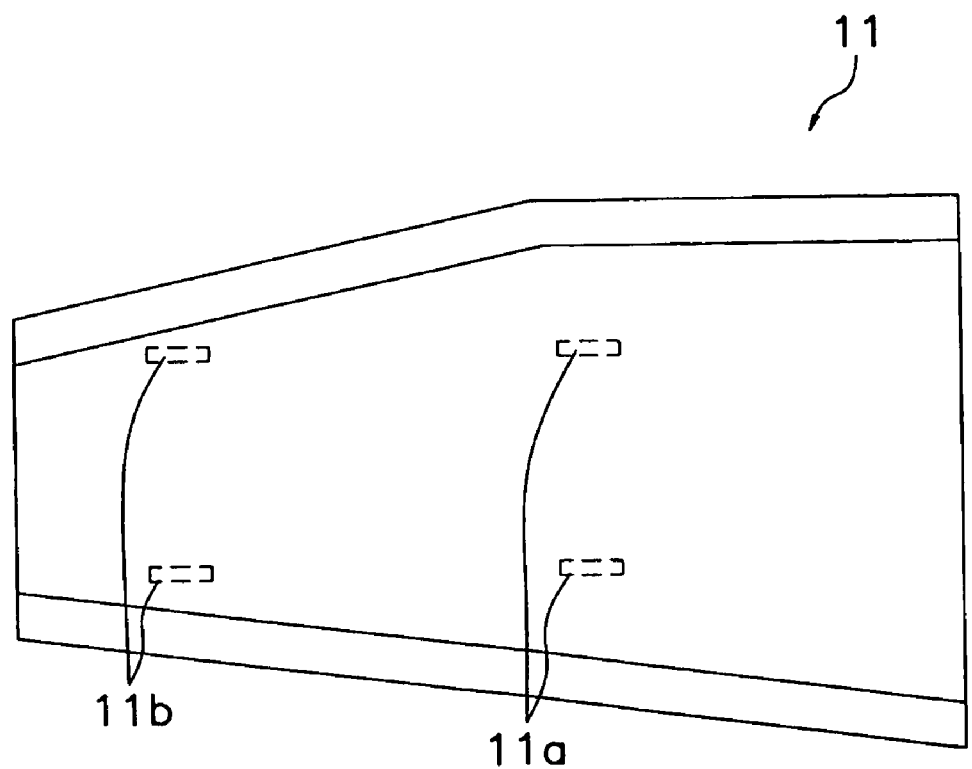

The trough 11, on which an object for transportation is to be placed, is a tray-like member of sheet metal which is formed by bending a stainless-steel plate. As shown in FIG. 1, the trough 11 is provided just above a motor box 12 in the state where a transportation surface thereof is horizontal. As shown in FIG. 2A and FIG. 2B, the trough 11 has two projections 11a and two projections 11b projecting vertically downward from a bottom surface thereof. The projections 11a and 11b are coupled, via screws or the like, with first recesses 15a and second recesses 15b (see FIG. 4A and FIG. 4B) which are formed at one ends of two first links (vertical members) 13a and two second links (vertical members) 13b described later. Thus, the trough 11 is supported by the first links 13a and the second links 13b.

With the transportation device 10 in this embodiment, a rotation driving force is conveyed from the rotatable motor (drive source) 14 in the motor box 12 to the trough 11 via a parallel link 13 described below. At this point, the trough 11 is reciprocated forward and backward with respect to the transportation direction, and thus an object is transported forward with respect to the transportation direction.

Parallel Link Mechanism 20

The parallel link mechanism 20 is for reciprocating the trough 11 forward and backward with respect to the transportation direction. As shown in FIG. 1, the parallel link mechanism 20 comprises the motor box 12, the parallel link 13 (the first links 13a, the second links 13b, and third links 13c), and link members 16.

Motor Box 12

As shown in FIG. 1, the motor box 12 comprises the rotatable motor 14 therein. By rotating the rotatable motor 14 in one direction, the parallel link 13 (the first links 13a, the second links 13b, and the third links 13c) is swung forward and backward with respect to the transportation direction via the link members 16 described later.

The rotatable motor 14 is a stepping motor having disc members 14a connected at tips of a rotation axis thereof. Each disc member 14a has a projection 14b at a position far from the rotation center of the rotatable motor 14. The projection 14b is connected to the corresponding link member 16. One end of the link member 16 is connected to the second link 13b, and the other end of the link member 16 is connected to the projection 14b. Thus, by merely rotating the rotatable motor 14 in one direction, the parallel link 13 can be swung forward and backward. As a result, the trough 11 connected to the parallel link 13 can be reciprocated.

The rotation of the rotatable motor 14 is controlled by the control unit 30 so as to move the trough 11 forward with respect to the transportation direction shown in FIG. 1 at a higher velocity than backward with respect to the transportation direction. The rotatable motor 14 is also controlled by the control unit 30 to perform so-called intermittent driving, i.e., to stop the trough 11 in a rear end area of a movable range of the trough 11 for a predetermined time period after each reciprocation as shown in FIG. 1. Thus, the torque of the rotatable motor 14 can be reduced, which allows a smaller volume of motor to be mounted.

In this embodiment, as shown in FIG. 1, the motor box 12 is located just below the trough 11. The present invention is not limited to this, and the motor box 12 may be located, for example, to the side of, or behind, the trough 11.

Parallel Link 13

The parallel link 13 comprises the first links 13*a*, the second links 13*b*, and the third links 13*c*.

As shown in FIG. 1, one end of each first link 13*a* is pivotably connected to the corresponding third link 13*c* and the corresponding link member 16. The other end of each first link 13*a* is pivotably connected to a corresponding side surface of the motor box 12. One end of each second link 13*b* is pivotably connected to the corresponding third link 13*c*, and the other end of each second link 13*b* is pivotably connected to the corresponding side surface of the motor box 12. Thus, when a rotation driving force is conveyed from the rotatable motor 14 to the parallel link 13 via the link members 16, the parallel link 13 swings forward and backward within a vertical plane, around the connection points with the motor box 12 as the pivoting center.

Figure 4A:
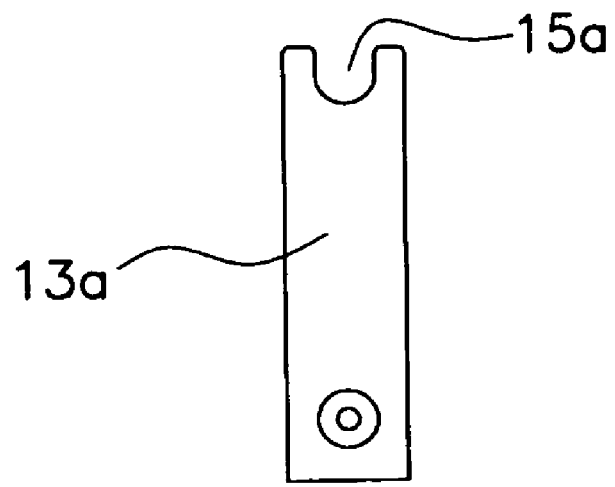
FIG. 4A and FIG. 4B are respectively front views of two supporting members.

The first links 13*a* are provided at positions on the side surfaces of the motor box 12, which are forward with respect to the transportation direction as compared to the second links 13*b*. As shown in FIG. 4A, each first link 13*a* has the first recess 15*a* at one (upper) end thereof. The first recess 15*a* is formed to be open upward in the vertical direction, and holds the projection 11*a* of the trough 11 described above.

Figure 4B:
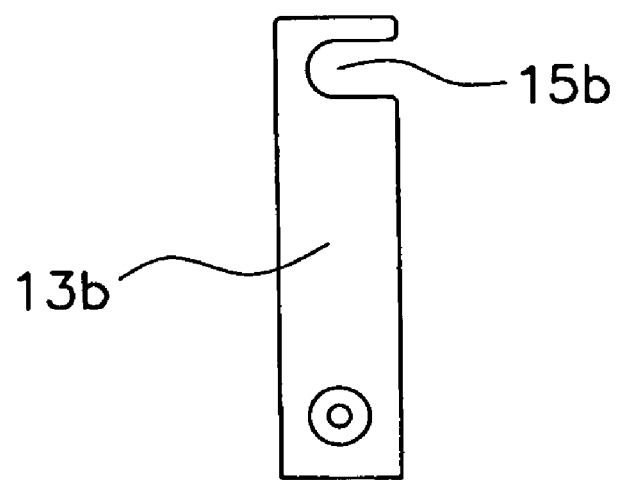

The second links 13*b* are provided at positions on the side surfaces of the motor box 12 backward with respect to the transportation direction as compared with the first links 13*a*. As shown in FIG. 4B, each second link 13*b* has the second recess 15*b* at one (upper) end thereof. The second recess 15*b* is formed to be open forward with respect to the transportation direction in a horizontal direction of the object, i.e., horizontally and inward with respect to the parallel link mechanism 20, and holds the projection 11*b* of the trough 11 described above.

As shown in FIG. 1, each third link 13*c* is connected to the first link 13*a* and the second link 13*b* at the lower ends thereof. Thus, by swinging the first link 13*a* connected to the link member 16, the second link 13*b* can also be swung. As a result, the entirety of the parallel link 13 can be swung forward and backward with respect to the transportation direction.

Figure 3:
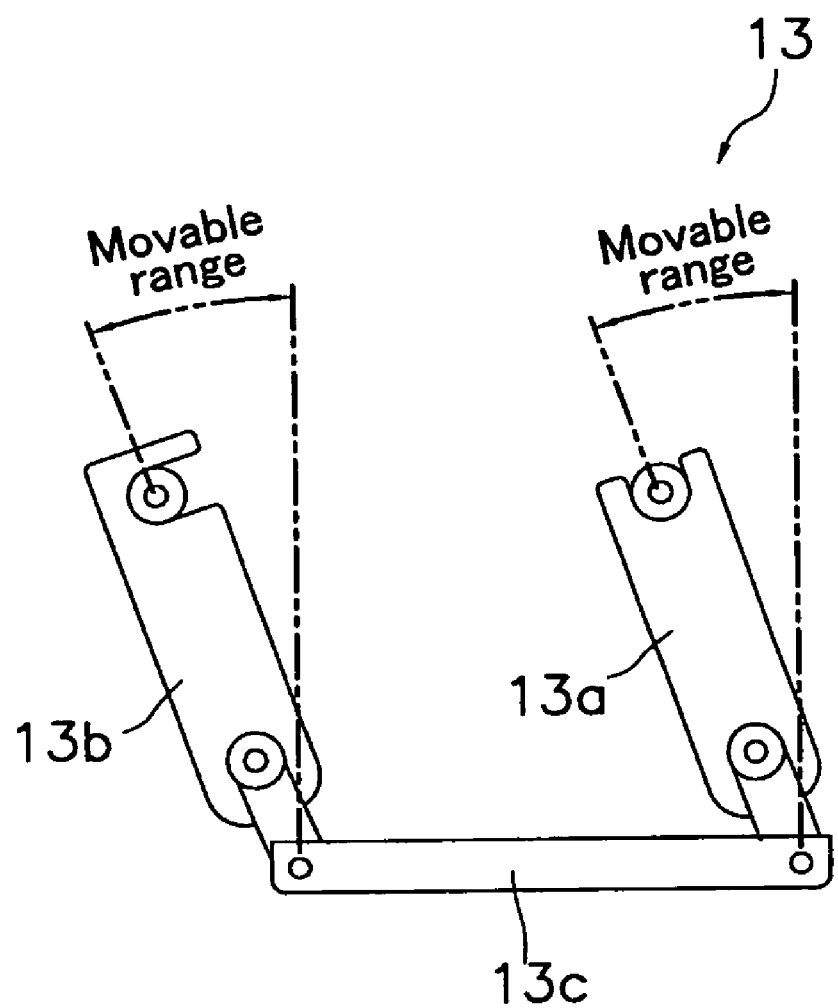
FIG. 3 is a front view of a movable range of a parallel link included in the transportation device shown in FIG. 1.

As shown in FIG. 3, the first link 13*a* and the second link 13*b* each pivot around the coupling point with the side surface of the motor box 12 as the pivoting center, and swing forward and backward with respect to the transportation direction in a range between a position at which the links 13*a* and 13*b* are inclined backward with respect to the transportation direction (second state) and a position at which the links 13*a* and 13*b* are parallel to the vertical direction (first state). By reciprocating the trough 11 such that the movable range of the parallel link 13 includes a rear area with respect to the transportation direction in this manner, the object on the trough 11 is supplied with a force of throwing the object obliquely upward from the trough 11 forward with respect to the transportation direction. Therefore, the object which is being transported is gradually transported forward with respect to the transportation direction so as to be thrown obliquely upward from the trough 11.

The parallel link 13 is attached to the trough 11 at a position backward with respect to the transportation direction, i.e., backward from the center of the trough 11.

Link Members 16

As shown in FIG. 1, one end of link member 16 is pivotably connected to the parallel link 13 (the first link 13*a* and the link member 16), and the other end of each link member 16 is pivotably connected to the projection 14*b* of the disc member 14*a* of the rotatable motor 14. When the rotatable motor 14 starts rotating, the disc member 14*a* rotates. The link member 16 connected to the projection 14*b* of the disc member 14*a* is secured so as to be pivotable around the projection 14*b* as the pivoting center. Therefore, the link member 16 can cause, by the rotation of the rotatable motor 14, the parallel link 13 (the first link 13*a*) connected to the other end of the link member 16 to swing forward and backward, around the connection point with the motor box 12 as the pivoting center.

As described above, with the transportation device 10 in this embodiment, a rotation driving force of the rotatable motor 14 is conveyed to the parallel link 13 via the link 16, not directly to the parallel link 13. Thus, the trough 11 can be reciprocated by rotating the rotatable motor 14 in one direction, with no need to rotate the rotatable motor 14 forward and backward.

Description of the Operation of the Transportation Device 10

Now, a process of transporting an object by the transportation device 10 in this embodiment will be described.

First, when the user inputs an instruction to start the transportation, the control unit 30 starts the rotation of the rotatable motor 14 of the parallel link mechanism 20. A rotation driving force from the rotatable motor 14 is conveyed to the parallel link 13 (the first links 13*a*) via the link members 16 and thus swings the parallel link 13 forward and backward within a vertical plane which is parallel to the transportation direction. Since the parallel link 13 which is being swung is connected to the projections 11*a* and 11*b* projecting from the bottom surface of the trough 11, the trough 11 can be reciprocated forward and backward with respect to the transportation direction.

The parallel link 13 for reciprocating the trough 11 forward and backward with respect to the transportation direction swings forward and backward in the movable range shown in FIG. 3, with the connection point between each first link 13*a* and the corresponding third link 13*c* and the connection point between each second link 13*b* and the corresponding third link 13*c* being the pivoting centers. In more detail, the first and second links 13*a* and 13*b* swing forward and backward repeatedly between the first state where the links 13*a* and 13*b* are parallel to the vertical direction and the second state where the links 13*a* and 13*b* are inclined backward with respect to the transportation direction. By swinging the first and second links 13*a* and 13*b* forward and backward in a rear area with respect to the transportation direction in this manner, the trough 11 can be reciprocated so as to throw an object on the trough 11 obliquely upward forward with respect to the transportation direction. As a result, the object on the trough 11 can be supplied with a force directed obliquely upward. Therefore, for example, even an object having a sticky surface, an object absorbing vibration, or an object containing a significant amount of moisture can be smoothly transported without being slid on the transportation surface of the trough 11.

In addition, with the transportation device 10, the control unit 30 controls the rotatable motor 14 so as to perform so-called intermittent driving, i.e., to stop the trough 11 once for a predetermined time period after each reciprocation. The trough 11 is stood still in an rear end area of the range in which the trough 11 is reciprocated. In the case where the trough 11 is controlled to continuously reciprocate, an object may occasionally slide on the transportation surface of the trough 11 and cannot be transported forward with respect to the transportation direction. By contrast, the transportation device 10 in this embodiment controls the trough 11 to stand still once after each reciprocation. With such control, the viscous resistance between the transportation surface of the trough 11 and the object is increased each time the trough 11 will be stationary. This can prevent the situation in which the object slides on the transportation surface of the trough 11 and cannot be properly transported. The intermittent control can also allow a smaller volume of motor to be mounted by reducing the torque of the rotatable motor 14.

Features of the Transportation Device 10 in this Embodiment (1)

As shown in FIG. 1, the transportation device 10 in this embodiment transports an object placed on the trough 11 in a predetermined direction by reciprocating the trough 11 by the parallel link mechanism 20. The control unit 30 controls the rotation driving of the rotatable motor 14 such that the trough 11 moves forward with respect to the transportation direction at a higher velocity than backward.

Thus, an object having a sticky surface, an object absorbing vibration, or the like, which is difficult to be transported by a conventional transportation mechanism of moving a trough backward with respect to the transportation direction at a higher velocity than forward, can be smoothly transported in a predetermined transportation direction.

(2)

As shown in FIG. 1, the transportation device 10 in this embodiment comprises the parallel link mechanism 20 comprises the first and second links 13a and 13b for supporting the trough 11, the rotatable motor 14, and the link members 16 as a mechanism for reciprocating the trough 11 in the transportation direction. Thus, a rotation driving force of the rotatable motor 14 is conveyed to the first and second links 13a and 13b via the link members 16, and thus the trough 11 can be reciprocated forward and backward with respect to the transportation direction.

(3)

In the transportation device 10 in this embodiment, the parallel link mechanism 20 as a reciprocating mechanism for reciprocating the trough 11 in the transportation direction comprises the first and second links 13a and 13b for supporting the trough 11. As shown in FIG. 3, the first and second links 13a and 13b swing forward and backward between the first state where the links 13a and 13b are parallel to the vertical direction and the second state where the links 13a and 13b are inclined backward with respect to the transportation direction.

By swinging the parallel link 13 (the first links 13a and the second links 13b) forward and backward in a range including a rear area with respect to the transportation direction in this manner with respect to the transportation direction, the object on the trough 11 can be supplied with a force directed obliquely upward. As a result, the object on the trough 11 can be transported so as to be thrown obliquely upward with respect to the transportation direction. Therefore, even an object having a sticky surface, an object absorbing vibration, or the like can be smoothly transported.

(4)

With the transportation device 10 in this embodiment, the control unit 30 performs so-called intermittent driving of stopping the trough 11 for a predetermined time period each time the trough 11 reciprocates forward and backward with respect to the transportation direction, before driving the trough 11. Moreover, the trough 11 is stood still in a rear end area of the range in which the trough 11 is reciprocated.

By making the trough 11 stationary after each reciprocation, the problem which occurs when the trough 11 is continuously reciprocated, i.e., the problem that the object slides on the transportation surface and cannot be properly transported, can be avoided. In addition, as compared to the situation in which the trough 11 is continuously reciprocated, the rotation frequency of the rotatable motor 14 can be reduced, and the object can be transported more efficiently.

(5)

The transportation device 10 in this embodiment uses, as an object to be transported, an object having a sticky surface such as pickles or the like, or an object liable to absorb vibration such as chicken meat or the like.

Even such objects which are not properly transported by a conventional transportation device can be smoothly transported by the transportation device 10 in this embodiment.

Embodiment 2

A transportation device according to another embodiment of the present invention will be described with reference to FIG. 5 through FIG. 8. Elements identical to those described above in Embodiment 1 bear identical reference numeral thereto and descriptions thereof will be omitted.

Figure 5:
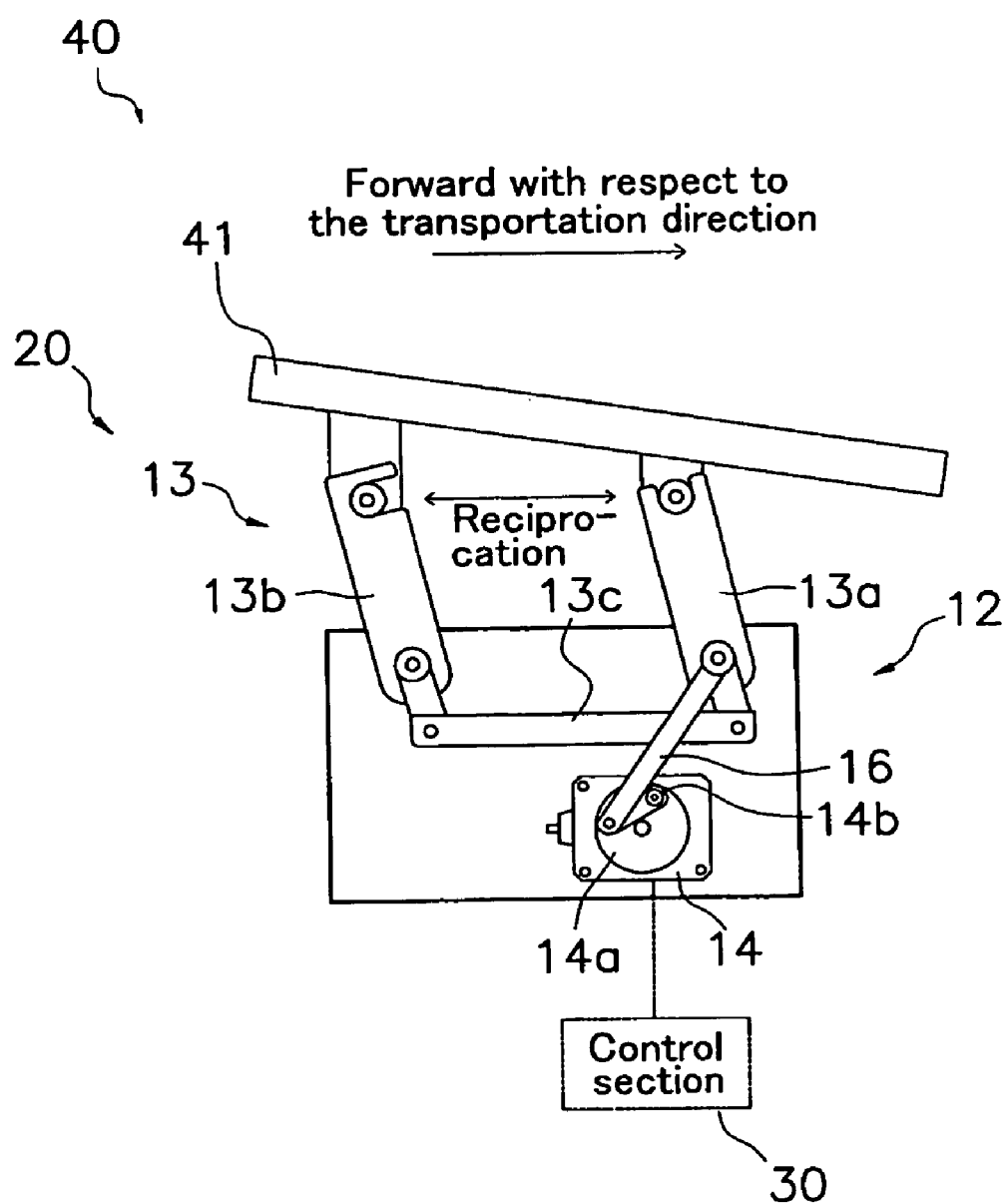
FIG. 5 is a lateral cross-sectional view of a transportation device according to Embodiment 2 of the present invention.
Figure 6A:
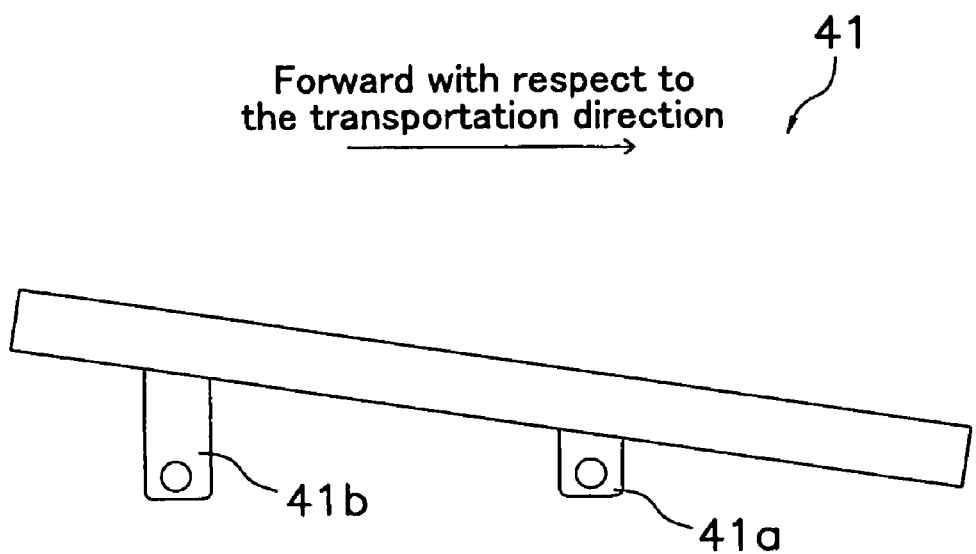
FIG. 6A and FIG. 6B are respectively a lateral cross-sectional view and a plan view of a trough included in the transportation device shown in FIG. 5.
Figure 6B:
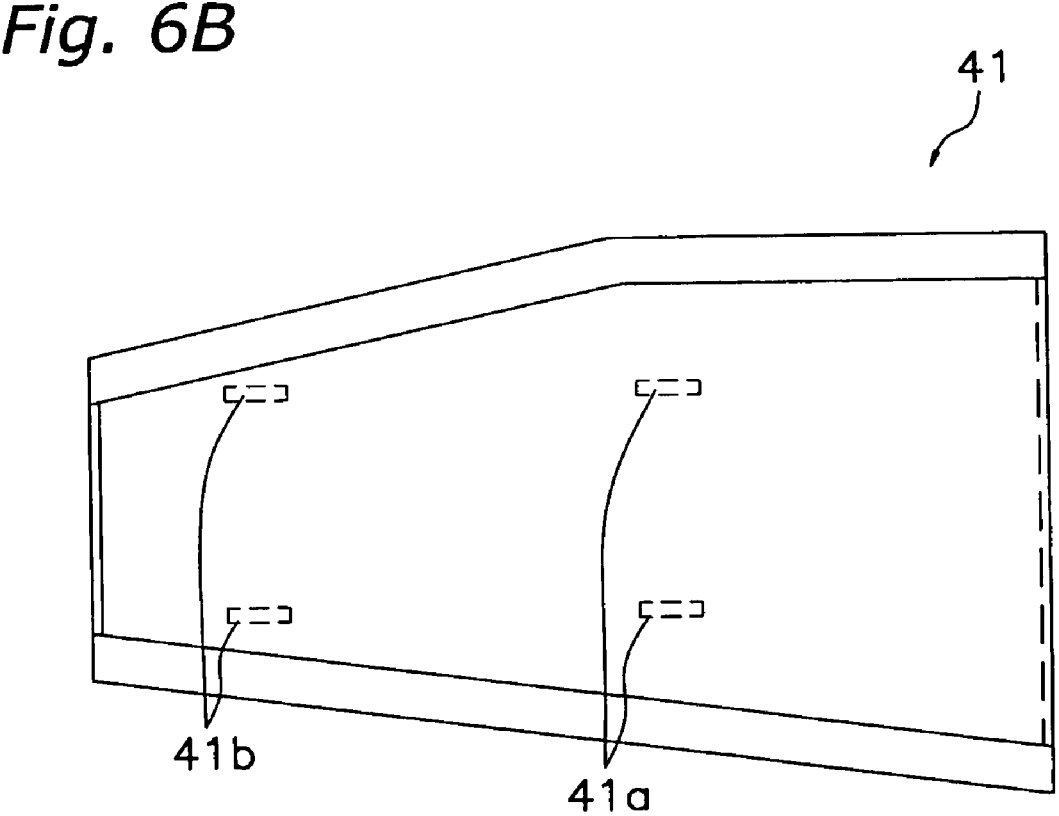

As shown in FIG. 5 and FIG. 6, a transportation device 40 in this embodiment is different from the transportation device 10 in Embodiment 1 in the following point. The transportation device 40 uses a trough 41 inclined down and forward with respect to the transportation direction, whereas the transportation device 10 uses the trough 11 having a horizontal transportation surface.

As in Embodiment 1, the transportation device 40 conveys a rotation driving force of the rotatable motor 14 to the parallel link 13 (the first links 13a and the second links 13b) via the link members 16 or the like. Thus, the first links 13a and the second links 13b, which are coupled to projections 41a and 41b of the trough 41 inclined down and forward with respect to the transportation direction, are swung forward and backward with respect to the transportation direction, and thus an object placed on the trough 41 is transported.

As with the transportation device 10 in Embodiment 1, the control unit 30 moves the trough 11 forward with respect to the transportation direction at a higher velocity than when moving it backward.

Namely, the transportation device 40 in this embodiment provides the trough 41 inclined downward forward with respect to the transportation direction, in addition to the control unit 30 controlling the trough 41 to move forward with respect to the transportation direction at a higher velocity than when it is moving backward.

Thus, for example, even an object having a sticky surface, an object that absorbs vibration, or an object containing a significant amount of moisture, which is difficult to be transported by a standard transportation mechanism, can be smoothly transported for the following reasons. The downward inclination of the trough 41 makes it easier to drop the object forward, and the control of transporting the trough 41 forward with respect to the transportation direction at a higher velocity increases the angle at which the object is thrown upward from the transportation surface of the trough 41, and therefore makes it easier for a force to act in a direction of separating the object from the transportation surface of the trough 41.

Figure 7A:
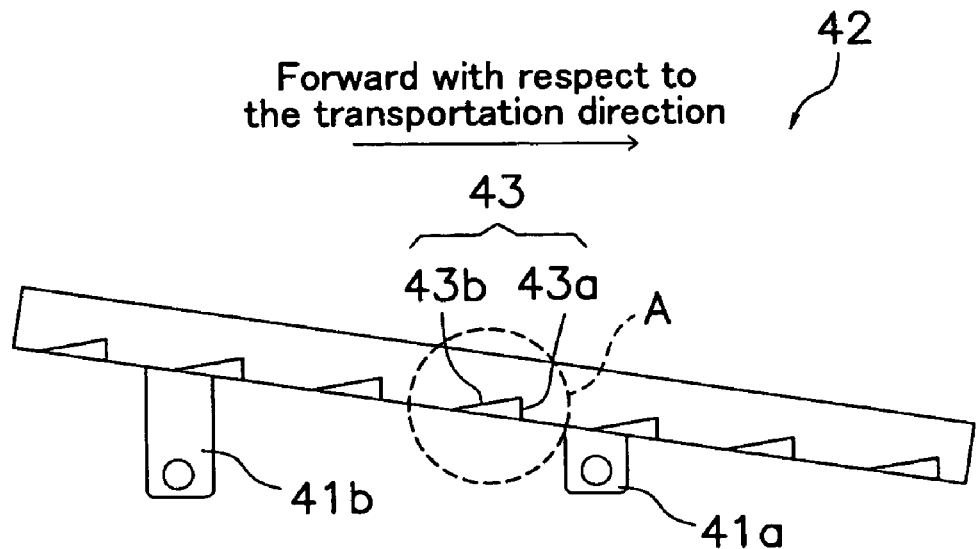
FIG. 7A and FIG. 7B are respectively a lateral cross-sectional view and a plan view of a trough included in a transportation device according to another embodiment of the present invention.
Figure 7B:
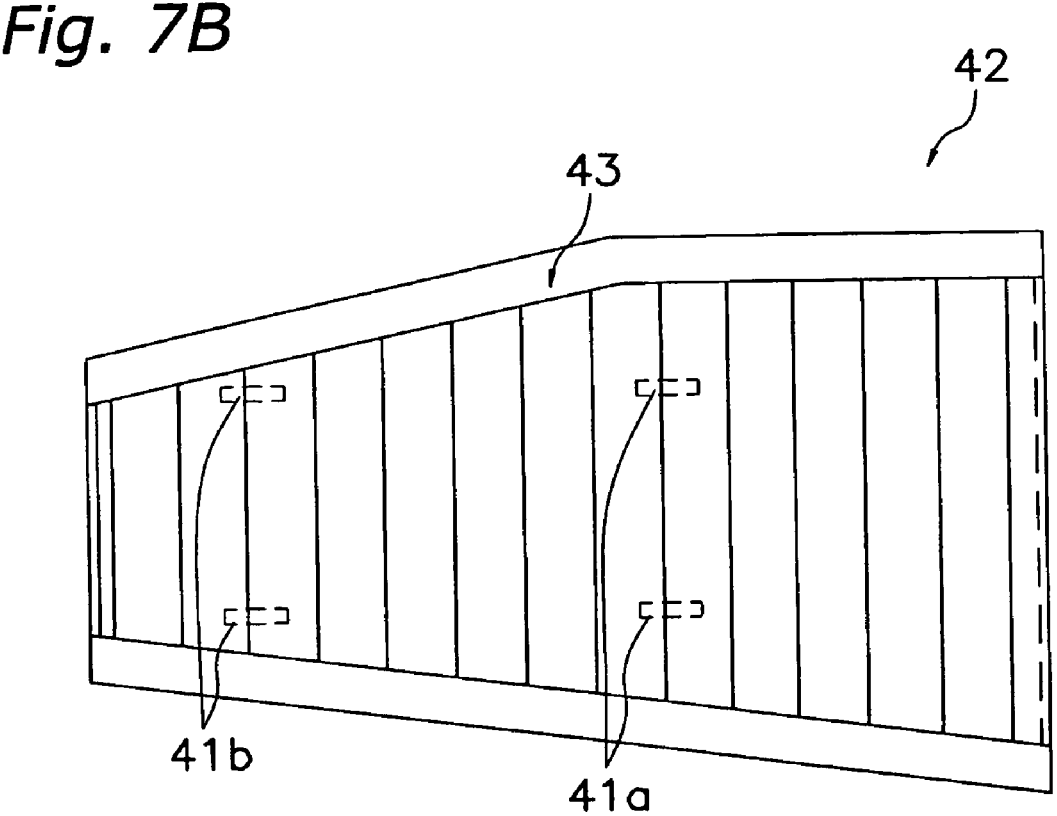

In the transportation device 40 in this embodiment, the transportation surface of the trough 41 inclined downward is flat. However, for example, as shown in FIG. 7, a trough 42 having a plurality of projections 43 each formed of a first face 43a and a second face 43b formed on a transportation surface thereof is also usable.

Figure 8:
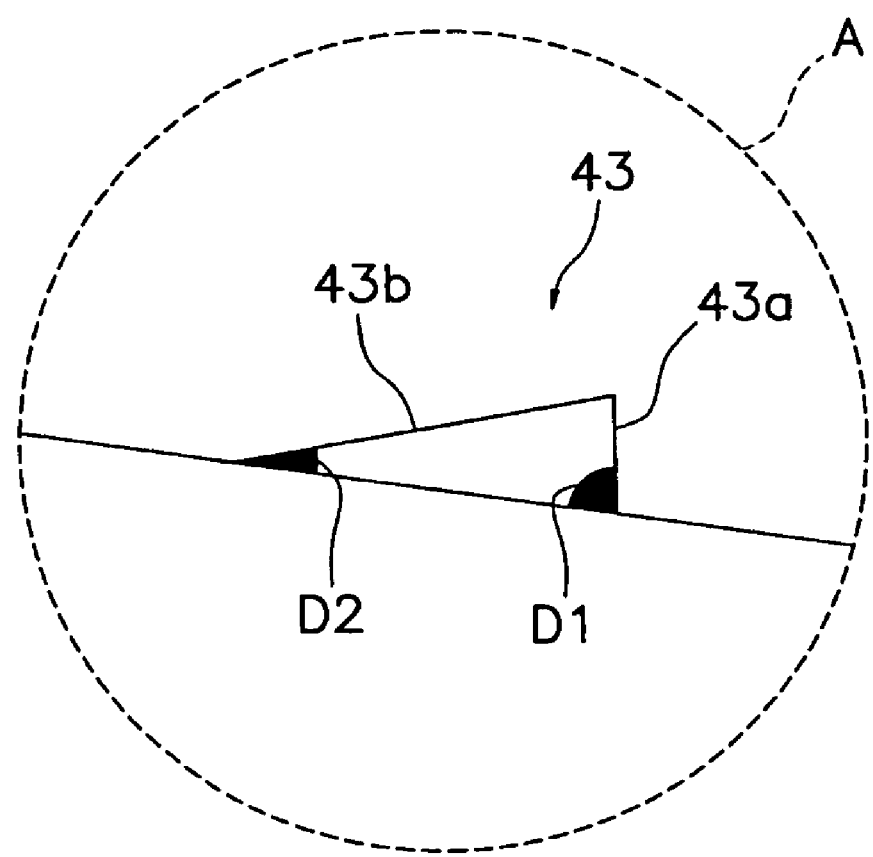
FIG. 8 is an enlarged view of part A in FIG. 7A.

The projections 43 are formed so as to project upward from the transportation surface of the trough 42. Each first face 43a is located at a forward position with respect to the transportation direction as compared with the corresponding second face 43b. An intersection of each projection 43 at which the first face 43a and the second face 43b cross each other is a portion of the projection 43 which projects from the transportation surface of the trough 42 by the greatest amount. As shown in FIG. 8, the first face 43a and the second face 43b are formed such that an inclination angle D1 of the first face 43a with respect to the transportation surface of the trough 42 is greater than an inclination angle D2 of the second face 43b with respect to the transportation surface.

In the situation in which the trough 42 having the projections 43 formed on the transportation surface thereof is used, when the trough 42 is reciprocated forward and backward with respect to the transportation direction, the following occurs. An object on the trough 42 is transported forward with respect to the transportation direction by the reciprocation of the trough 42 and the inclination of the trough 42. While the object is being transported, the first face 43a suppresses the object from moving backward with respect to the transportation direction, and the second face 43b prevents the object from sliding down on the trough 42 which is inclined forward with respect to the transportation direction.

Features of the Transportation Device 40 in this Embodiment (1)

In the transportation device 40 in this embodiment, the transportation surface of the trough 41 is inclined downward forward with respect to the transportation direction.

Thus, even an object, for example, having a sticky surface, absorbing vibration, or containing a significant amount of moisture, which is usually difficult to be transported, can be smoothly transported by the downward inclination of the trough 41 and the control of moving the trough 41 forward with respect to the transportation direction at a higher velocity than backward.

(2)

The transportation device 40 in this embodiment may use the trough 42 having projections 43 each including the first face 43a and the second face 43b on the transportation surface thereof. As shown in FIG. 8, each projection 43 is formed such that the inclination angle D1 of the first face 43a with respect to the transportation surface is greater than the inclination angle D2 of the second face 43b with respect to the transportation surface.

Thus, for example, even an object having a sticky surface, an object absorbing vibration, or an object containing a significant amount of moisture, which is difficult to be transported by a standard transportation system, can be smoothly transported since the first face 43a suppresses the object from moving backward with respect to the transportation direction. In addition, the second face 43b can solve the problem that, for example, the object slides down when the trough 42 is stopped reciprocating.

As a result, satisfactory transportation can be provided regardless of the type of the object by combining (i) movement of the trough 42 forward with respect to the transportation direction at a higher velocity than backwardly and (ii) the first face 43a and the second face 43b of the projections 43 formed on the transportation surface of the trough 42. In the case where the downward inclination of the trough 41 or 42 is added to the above-mentioned combination, the object can be transported more efficiently.

Example 1

Now, with reference to FIG. 11 through FIG. 13, test results on the transportation performance of the transportation device 10 in Embodiment 1 will be described.

In a transportation performance confirmation test performed here, a transportation system of moving the trough 11 forward with respect to the transportation direction at a higher velocity than backward (hereinafter, this system will be referred to as "FF") with respect to a transportation direction, and a transportation system of moving the trough 11 backward with respect to the transportation direction at a higher velocity than forward (hereinafter, this system will be referred to as "FB"), were compared. As the object to be transported, chicken meat was used. The transportation was performed under the condition of intermittent driving control.

As shown in FIG. 11, it was found that the object can be transported more smoothly by the FF system than by the FB system under the above-mentioned condition. For example, the test result of the FF system in which the forward moving velocity of the trough is 1500 pps and the backward moving velocity is 500 pps shows that the object is transported at 23.1 mm/s. In contrast, the test result of the FB system in which the moving velocities are inverted shows that the object is transported backward with respect to the transportation direction. Similarly, the test result of the FF system in which the forward moving velocity of the trough is 1000 pps and the backward moving velocity is 500 pps shows that the object is transported forward with respect to the transportation direction more efficiently than the FB system in which the moving velocities are inverted.

From the test results shown in FIG. 11, it was found that chicken meat can be transported forward with respect to the transportation direction more smoothly by the FF system than by the FB system.

Regarding the FF system, the time required to transport the trough 11 by 200 mm was measured using the parameters regarding whether the reciprocation of the trough 11 should be performed by intermittent driving control or continuous driving control, whether the transportation surface of the trough 11 should have projections 18 or not, and whether the first and second links 13a and 13b should be movable in a range so as to move the object horizontally or so as to throw the object upward (movable backward).

First, the results on whether the reciprocation of the trough 11 should be performed by intermittent driving control or continuous driving control will be described. As shown in the test results in FIG. 12, in the case where the forward moving velocity is 1500 pps and the backward moving velocity is 500 pps, the transportation velocity is higher with the continuous driving control. It is appreciated, through, in the case where the forward moving velocity is 1500 pps and the backward moving velocity is 1000 pps and where the forward moving velocity is 1500 pps and the backward moving velocity is 800 pps, the transportation velocity is higher with the intermittent driving control although the difference is about 0.5 to 1.0 second. Therefore, in order to transport an object at a higher velocity, it is preferable to select the intermittent driving control or the continuous driving control in accordance with the object to be transported or the forward and backward moving velocities.

Next, the results on whether the transportation surface of the trough 11 should have projections 18 or not will be described. From the test results in FIG. 13, it is clearly appreciated that transportation time can be significantly reduced by forming the projections 18 on the transportation surface of the trough 11. For example, as shown in FIG. 13, in the case where the transportation surface of the trough 11 has the projections (with projections), the transportation time can be significantly reduced as compared with the test results of the case where the transportation surface is flat (without projections), both when the trough is driven so as to move the object horizontally and when the trough is driven so as to throw the object upward (11.6 s to 4.7 s; 8.2 s to 3.5 s). It was found from this that the transportation time can be reduced by forming the projections 18 on the transportation surface of the trough 11.

The results on whether the trough 11 should be reciprocated by horizontal driving control or by throw-upward driving control as shown in FIG. 3 will be described. It was found that the transportation time can be reduced by the throw-upward driving control. For example, the test results of the case where the transportation surface of the trough 11 is flat with no projections 18 show that the transportation time is 11.6 s by the horizontal driving control and is 8.2 s by the throw-upward driving control. The test results of the case where the transportation surface of the trough 11 has the projections 18 show that the transportation time is 4.7 s by the horizontal driving control and is 3.5 s by the throw-upward driving control. Therefore, it was found that the transportation time can be reduced by the throw-upward driving control under both conditions. From the test results shown in FIG. 14, it was found that the transportation time can be significantly reduced by forming the projections 18 on the transportation surface of the trough 11.

Referring to the above-described test results, it was found that the transportation time can be reduced by (i) forming the projections 18 on the transportation surface of the trough 11 and (ii) reciprocating the trough 11 in a range including an inclined position of the trough 11 backward with respect to the transportation direction so as to throw the object upward forward with respect to the transportation direction rather than reciprocating the trough 11 horizontally.

By adding the condition of inclining the trough 11 down and forward with respect to the transportation direction to the above-described conditions, the object which is being transported is more easily transported forward with respect to the transportation direction. Therefore, the transportation time can be further reduced.

Embodiment 3

A combinational weighing device including a transportation device according to yet another embodiment of the present invention will be described with reference to FIG. 9 and FIG. 10.

Overall Structure of Combinational Weighing Device 50

Figure 9:
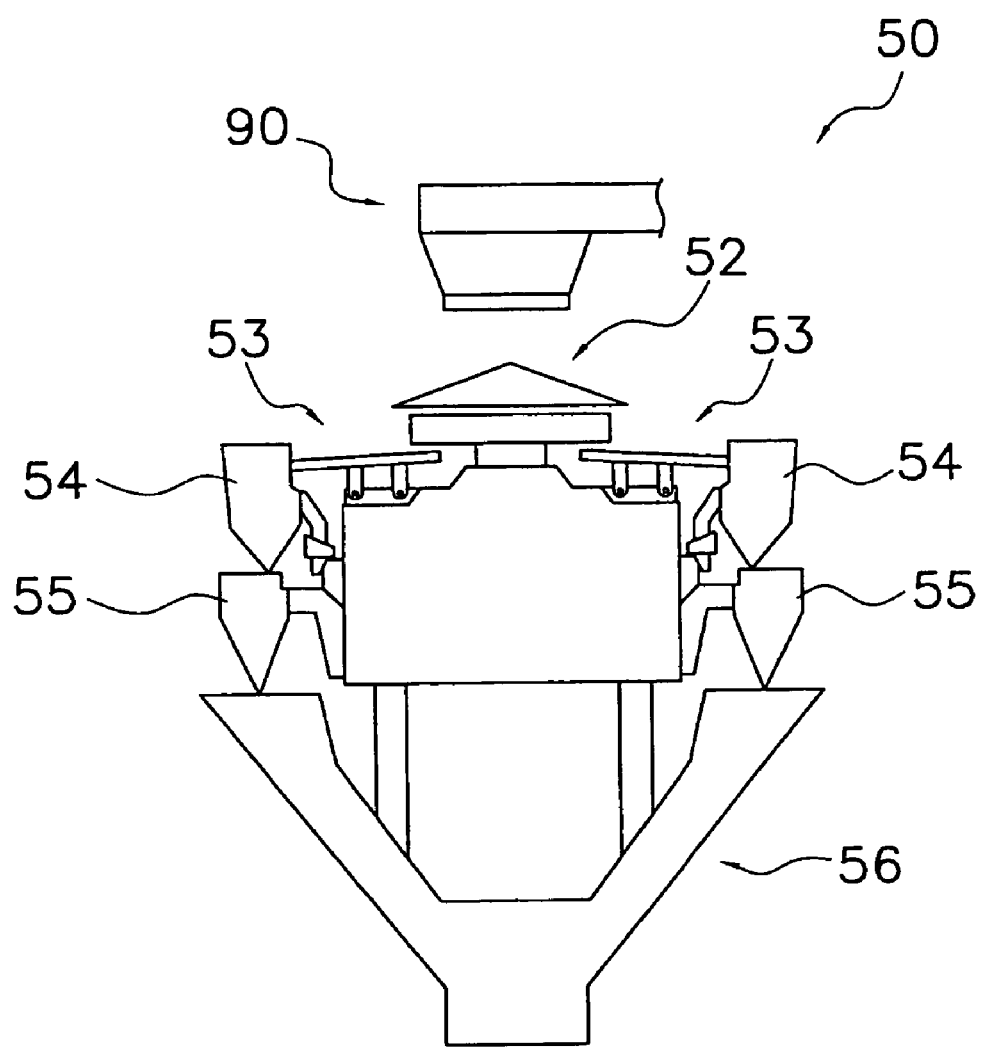
FIG. 9 is a schematic view illustrating the structure of a combinational weighing device according to Embodiment 3 of the present invention.

As shown in FIG. 9, a combinational weighing device 50 according to this embodiment performs combinational weighing such that an assembly of objects to be weighed has a predetermined weight or a predetermined number, using measurement values of a plurality of weighing hoppers (weighing unit, discharging unit) 55. The combinational weighing device 50 includes the transportation device 40 described above in Embodiment 2 as a supply trough group 53. The structure of the supply trough group 53 is substantially the same as that of the transportation device 40 described above in Embodiment 2. Therefore, elements thereof bear identical reference numeral thereto and the detailed description of the structure will be omitted.

The combinational weighing device 50 mainly includes a cone-shaped dispersion table 52 located just below a position to which an object to be weighed (hereinafter, referred to as an "object") is dropped by a supply conveyer device 90 provided at a previous stage, the supply trough group (transportation device) 53 located around the dispersion table 52, a plurality of pool hoppers 54 and weighing hoppers (weighing unit, discharging unit) 55, and a collecting and discharging chute 56.

Figure 10:
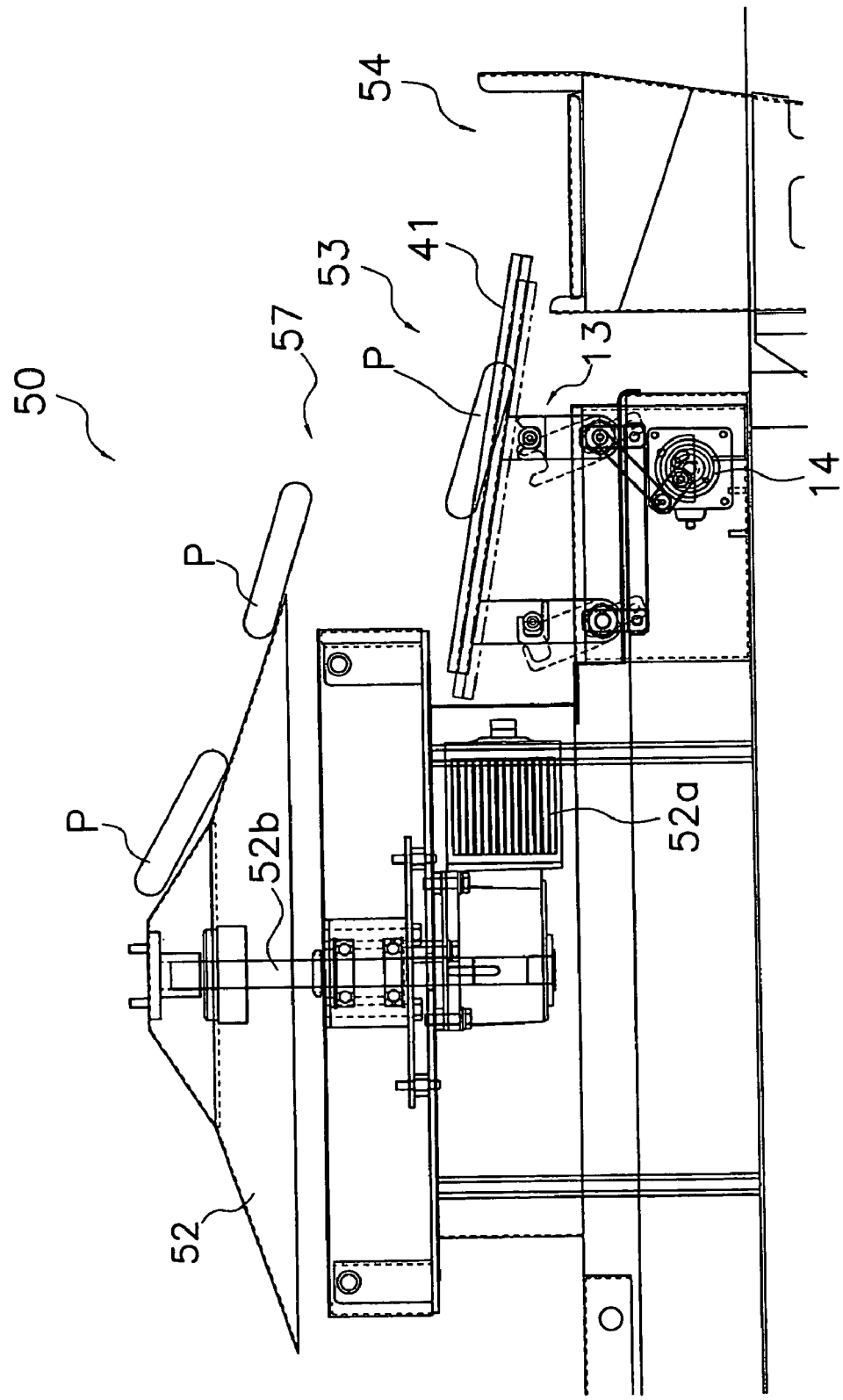
FIG. 10 is a lateral view illustrating the structure of a dispersion table and the vicinity thereof of the combinational weighing device shown in FIG. 9.

As shown in FIG. 10, the dispersion table 52 is an umbrella-like circular plate, and is continuously rotated by a driving motor (driving mechanism) 52a. Objects supplied to a top surface of the dispersion table 52 from the supply conveyer 90 move to the supply trough group 53 while being dispersed by a centrifugal force.

Each trough 41 of the supply trough group 53 transports an object in a transportation direction (outward in a radial direction of a circle having the dispersion table 52 at the center) by a rotation driving force of the rotatable motor 14 (see FIG. 1) being conveyed to the trough 41 via the parallel link 13 or the like.

Each pool hopper 54 receives an object from the supply trough group 53, temporarily pools the object, opens an open/close gate provided at a lower position thereof by an instruction of a control unit (not shown), and supplies the object to the corresponding weighing hopper 55.

Each weighing hopper 55 is provided below the corresponding pool hopper 54. A plurality of pool hoppers 54 and weighing hoppers 55 are provided along a circumferential direction in correspondence with the troughs 41. Each weighing hopper 55 has a load cell (not shown) for weighing the object therein. Each weighing hopper 55 also has an open/close gate (not shown) at a lower position of the load cell for throwing the object to the collecting and discharging chute 56 in order to allow the weighing hopper 55 to act as a discharging unit.

The collecting and discharging chute 56 collects the objects thrown from the weighing hoppers 55 and flows the objects down to a device at a subsequent stage, such as a packaging device or the like.

Structure of the Dispersion Table 52

The dispersion table 52 is located at the center of the supply trough group 53 located circumferentially, and upstream with respect to, and immediately adjacent to, the supply trough group 53. The dispersion table 52 transports objects supplied from the supply conveyer device 90 toward the supply trough group 53.

The dispersion table 52 receives a rotation driving force from the driving motor (driving mechanism) 52a to continuously rotate in a horizontal direction. More specifically, the rotation driving force of the driving motor 52a is conveyed to a support unit 52b for supporting the dispersion table 52 via a plurality of gears (not shown), and therefore the dispersion table 52 connected to the supporting unit 52b is rotated in the horizontal direction. Thus, a centrifugal force can be applied to the objects supplied to the dispersion table 52, and the objects can be transported substantially uniformly to a plurality of troughs 41 in the supply trough group 53 located so as to surround the dispersion table 52.

Features of the Combinational Weighing Device 50

(1)

As shown in FIG. 9, the combinational weighing device 50 in this embodiment includes a plurality of transportation devices 40 described above in Embodiment 2 as the supply trough group 53 in addition to the dispersion table 52, the pool hoppers 54, and the weighing hoppers 55.

Thus, even when the object to be transported has a sticky surface, absorbs vibration, or contains a significant amount of moisture (e.g., pickles, chicken meat, etc.), such an object can be smoothly transported to the pool hopper 54 provided at a downstream position.

Other Embodiments

The present invention has been described by way of embodiments. The present invention is not limited to the above-described embodiments, and various modifications can be made without departing from the scope of the present invention.

(A)

In Embodiments 1 to 3, as shown in FIG. 3, the trough 11 is reciprocated by moving the first links 13a and the second links 13b between the first state where the links 13a and 13b are parallel to the vertical direction and the second state where the links 13a and 13b are inclined backward with respect to the transportation direction. The present invention is not limited to this.

For example, the parallel link 13 may be reciprocated in a range including a position at which the links 13a and 13b are inclined forward with respect to the transportation direction as compared with the vertical direction. In this case also, since the first links 13a and the second links 13b are moved in a range including the position at which the links 13a and 13b are inclined backward with respect to the transportation direction, the object can be transported so as to be thrown upward.

The transportation device may merely transport an object forward with respect to the transportation direction at a higher velocity than backward, without determining the movable range of the first links 13a and the second links 13b such that the object is transported so as to be thrown upward. In this case also, an object such as chicken meat or the like can be smoothly transported in a predetermined direction as described in the above embodiments.

(B)

In Embodiments 1 to 3, the reciprocation of the trough 11 is realized by the parallel link mechanism 20. The present invention is not limited to this, and the reciprocation of the trough 11 may be realized by other transportation mechanisms.

(C)

In Embodiments 1 to 3, the reciprocation of the trough 11 is performed intermittently. The present invention is not limited to this.

For example, even when the trough 11 is continuously driven, an object which is usually difficult to be transported can be properly transported by the FF system described above.

Notably, though, it is preferable to perform intermittent driving control as in Embodiments 1 to 3, in order to improve the driving efficiency by the rotatable motor 14. Therefore, the intermittent driving control and the continuous driving control are preferably combined when necessary in accordance with the type of the object to be transported or the moving velocity of the trough 11.

(D)

In Embodiments 1 to 3, chicken meat, pickles or the like is used as the object to be transported. The present invention is not limited to this.

For example, objects which have a sticky surface, are soft and absorb vibration, or contain a significant amount of moisture other than those described above, which are difficult to be transported by a standard transportation mechanism (for example, a transportation mechanism for transporting a trough backward with respect to the transportation direction at a higher velocity than forward), can be satisfactorily transported by a transportation device according to the present invention.

(E)

In Embodiment 3, the transportation devices 40, described in Embodiment 2, including the trough 41 having a transportation surface inclined down are provided as the supply trough group 53. The present invention is not limited to this.

For example, the transportation device 10, described above in Embodiment 1, including the trough 11 having a flat transportation surface may be applied.

Embodiment 4

A transportation device according to one embodiment of the present invention will be described with reference to FIG. 15 through FIG. 19.

Overall Structure of Transportation Device 110

Figure 15:
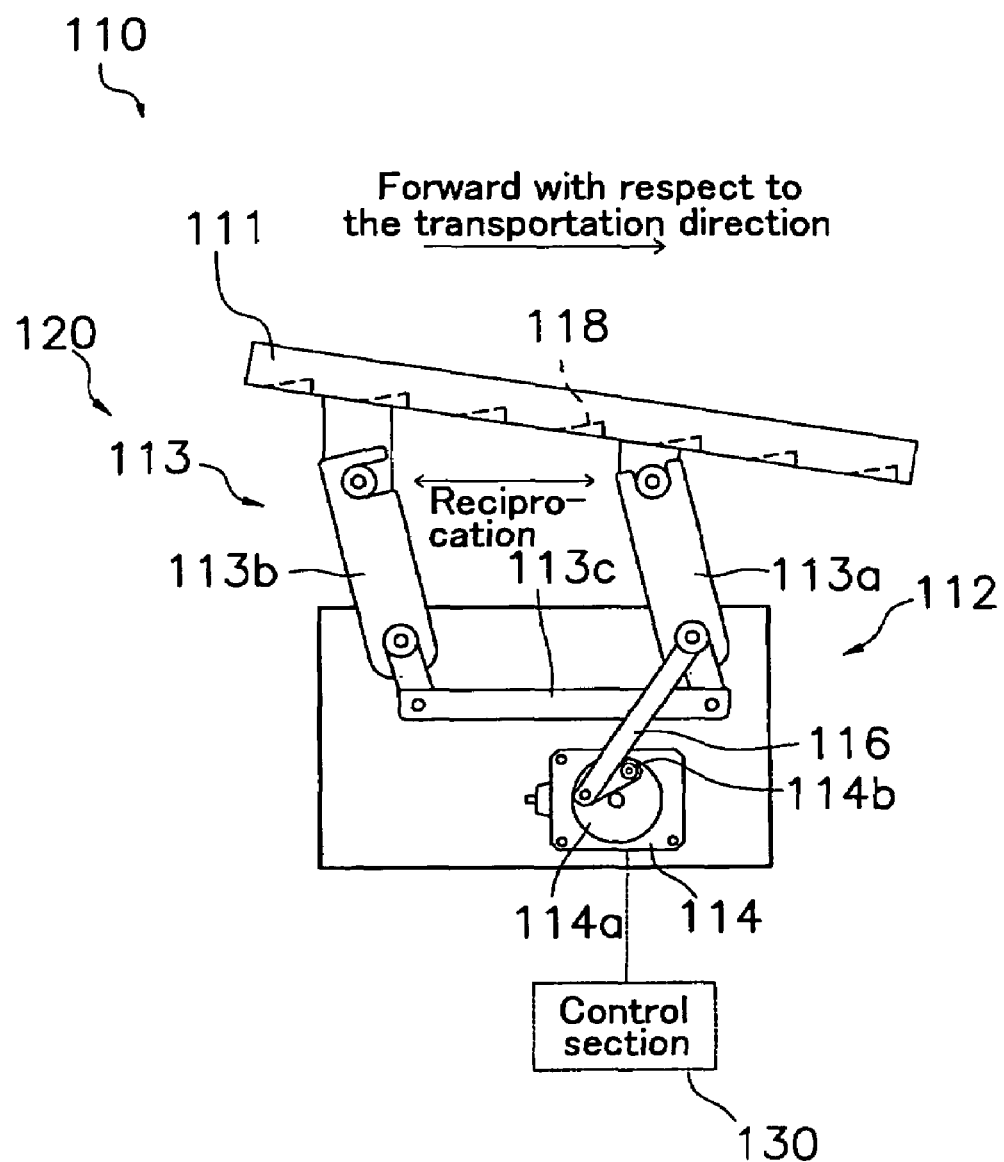
FIG. 15 is a lateral cross-sectional view of a transportation device according to Embodiment 4 of the present invention.

A transportation device 110 according to one embodiment of the present invention is for transporting an object placed on a trough 111 in a predetermined transportation direction. As shown in FIG. 15, the transportation device 110 comprises the trough 111, a parallel link mechanism (reciprocating mechanism) 120, and a control unit 130. With the transportation device 110, an object is transported by reciprocating the trough 111 with respect to the transportation direction by the parallel link mechanism 120. Also with the transportation device 110, the control unit 130 controls the trough 11 to reciprocate intermittently to stop after each reciprocation and to move forward and backward with respect to the transportation direction at an equal velocity. The control unit 130 is connected to a rotatable motor 114 described below, and controls the rotation driven by the motor 114 and also controls the entirety of the transportation device 110.

Trough 111

Figure 16A:
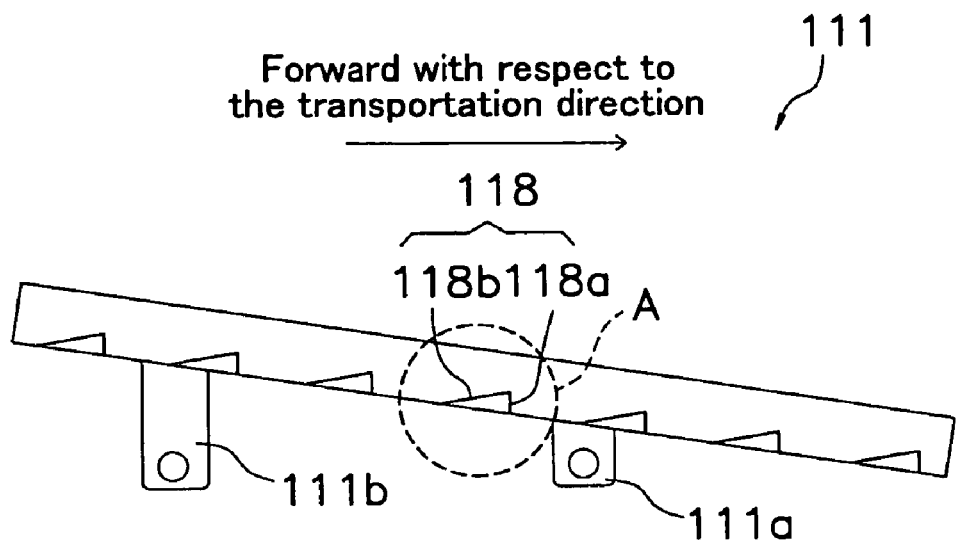
FIG. 16A and FIG. 16B are respectively a lateral cross-sectional view and a plan view of a trough included in the transportation device shown in FIG. 15.
Figure 16B:
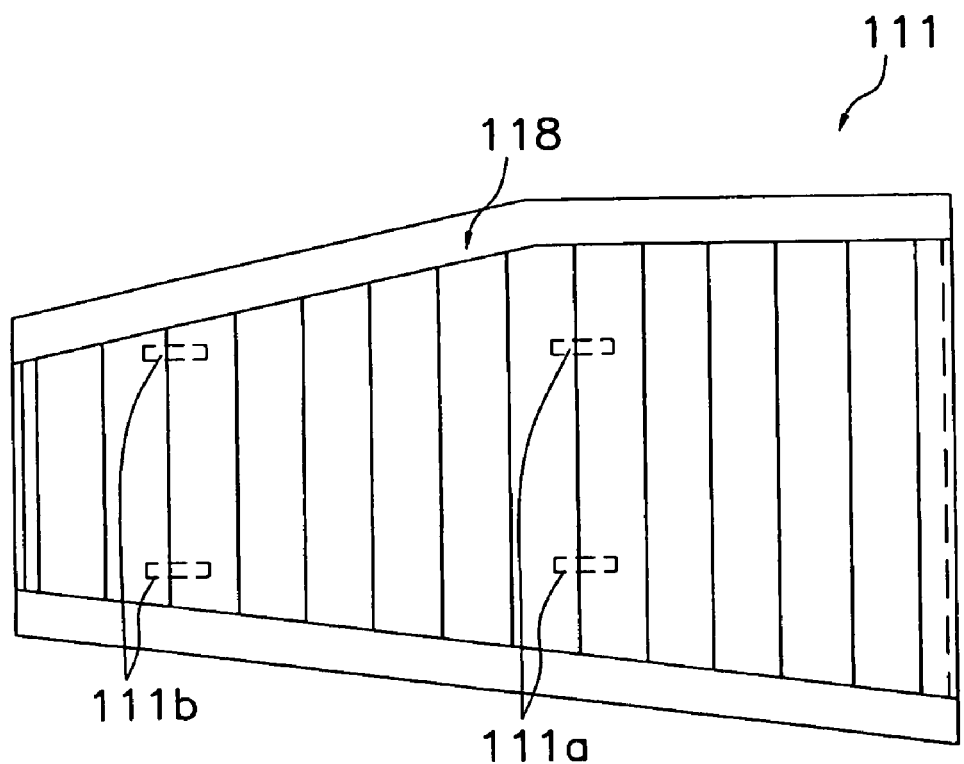

The trough 111, on which an object for transportation is to be placed, is a tray-like member of steel metal, which is formed by bending a stainless-steel plate. As shown in FIG. 15, the trough 111 is provided just above a motor box 112 in the state where a transportation surface thereof is inclined down and forward with respect to the transportation direction. As shown in FIG. 16A and FIG. 16B, the trough 111 has two projections 111a and two projections 111b projecting vertically downward from a bottom surface thereof. The projections 111a and 111b are coupled, via screws or the like, with first recesses 115a and second recesses 115b (see FIG. 18A and FIG. 18B) which are formed at one ends of two first links (vertical members) 113a and two second links (vertical members) 113b described below. Thus, the trough 111 is supported by the first links 113a and the second links 113b.

With the transportation device 110 in this embodiment, a rotation driving force is conveyed from the rotatable motor (drive source) 114 in the motor box 112 to the trough 111 via a parallel link 113 described below. At this point, the trough 111 is reciprocated forward and backward with respect to the transportation direction, and thus an object is transported forward with respect to the transportation direction.

Figure 19:
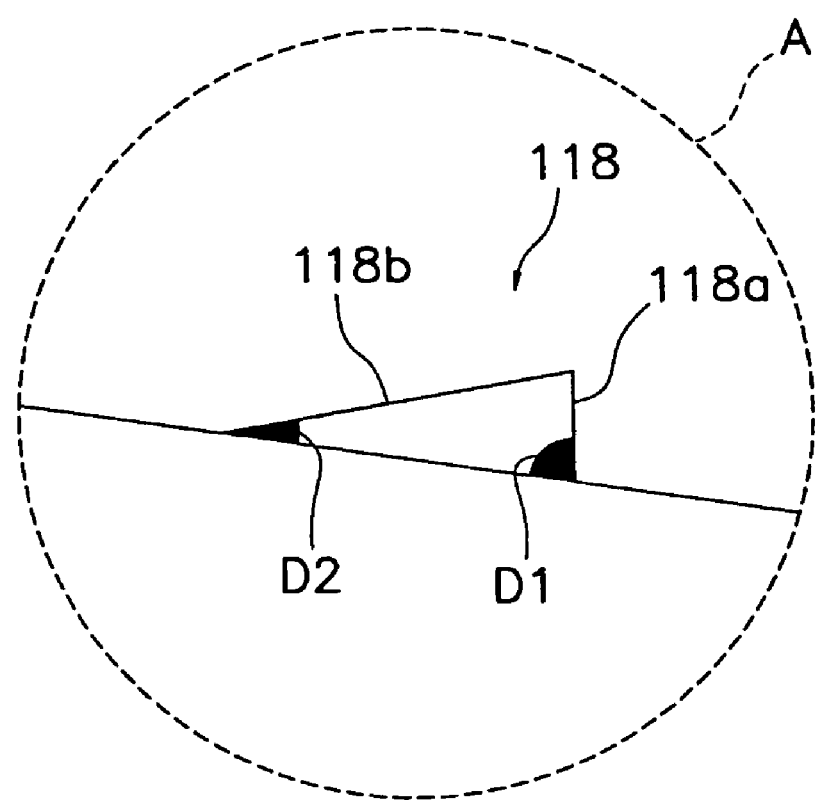
FIG. 19 is an enlarged view of part A in FIG. 16A.

As shown in FIG. 16A and FIG. 16B, the trough 111 has a plurality of projections 118 on a transportation surface thereof. Each projection 118 is formed of a first face 118a and a second face 118b. The projections 118 are formed so as to project upward from the transportation surface of the trough 111. Each first face 118*a* is located at a forward position with respect to the transportation direction as compared with the corresponding second face 118*b*. A portion of each projection 118 at which the first face 118*a* and the second face 118*b* cross each other is a portion of the projection 118 which projects from the transportation surface of the trough 111 by the greatest amount. As shown in FIG. 19, the first face 118*a* and the second face 118*b* are formed such that an inclination angle D1 of the first face 118*a* with respect to the transportation surface of the trough 111 is greater than an inclination angle D2 of the second face 118*b* with respect to the transportation surface. Therefore, when the trough 111 is reciprocated forward and backward with respect to the transportation direction, the following occurs. An object on the trough 111 is transported forward with respect to the transportation direction by the reciprocation of the trough 111 and the inclination of the trough 111. While the object is being transported, the first face 118*a* prevents the object from moving backward with respect to the transportation direction, and the second face 118*b* prevents the object from sliding down along the trough 111 inclined forward with respect to the transportation direction.

Parallel Link Mechanism 120

The parallel link mechanism 120 is for moving the trough 111 forward and backward with respect to the transportation direction at an equal velocity. As shown in FIG. 15, the parallel link mechanism 120 comprises the motor box 112, the parallel link 113 (the first links 113*a*, the second links 113*b*, and third links 113*c*), and link members 116.

Motor Box 112

As shown in FIG. 15, the motor box 112 comprises the rotatable motor (driving unit) 114 therein. By rotating the rotatable motor 114 in one direction, the parallel link 113 (the first links 113*a*, the second links 113*b*, and the third links 113*c*) is swung forward and backward with respect to the transportation direction via the link members 116 described below.

The rotatable motor 114 is a stepping motor having disc members 114*a* connected at tips of a rotation axis thereof. Each disc member 114*a* has a projection 114*b* at a position far from the rotation center of the rotatable motor 114. The projection 114*b* is connected to the corresponding link member 116. One end of the link member 116 is connected to the second link 113*b*, and the other end of the link member 116 is connected to the projection 114*b*. Thus, by merely rotating the rotatable motor 114 in one direction, the parallel link 113 can be swung forward and backward. As a result, the trough 111 connected to the parallel link 113 can be reciprocated.

The rotation of the rotatable motor 114 is controlled by the control unit 130 so as to reciprocate the trough 111 forward and backward with respect to the transportation direction shown in FIG. 15 at an equal velocity. The rotatable motor 114 is also controlled by the control unit 130 to perform so-called intermittent driving, i.e., to stop the trough 111 for a predetermined time period after each reciprocation. Thus, the torque of the rotatable motor 114 can be reduced, which allows a smaller volume of motor to be mounted.

In this embodiment, as shown in FIG. 15, the motor box 112 is located just below the trough 111. The present invention is not limited to this, and the motor box 112 may be located, for example, to the side of, or behind, the trough 111.

Parallel Link 113

The parallel link 113 comprises the first links 113*a*, the second links 113*b*, and the third links 113*c*.

As shown in FIG. 15, one end of each first link 113*a* is pivotably connected to the corresponding third link 113*c* and the corresponding link member 116. The other end of each first link 113*a* is pivotably connected to a corresponding side surface of the motor box 112. One end of each second link 113*b* is pivotably connected to the corresponding third link 113*c*, and the other end of each second link 113*b* is pivotably connected to the corresponding side surface of the motor box 112. Thus, when a rotation driving force is conveyed from the rotatable motor 114 to the parallel link 113 via the link members 116, the parallel link 113 swings forward and backward within a vertical plane, around the connection points with the motor box 112 as the pivoting center.

Figure 18A:
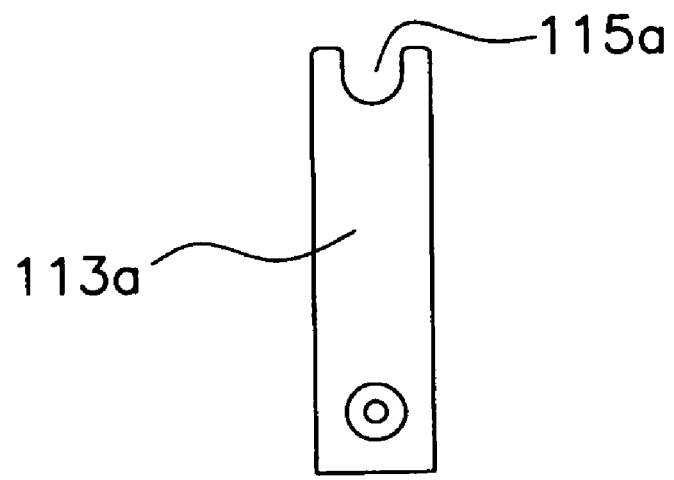
FIG. 18A and FIG. 18B are respectively front views of two supporting members.

The first links 113*a* are provided at positions on the side surfaces of the motor box 112 forward with respect to the transportation direction as compared to the second links 113*b*. As shown in FIG. 18A, each first link 113*a* has the first recess 115*a* at one (upper) end thereof. The first recess 115*a* is formed to be open upward in the vertical direction, and holds the one projection 111*a* of the trough 111 described above.

Figure 18B:
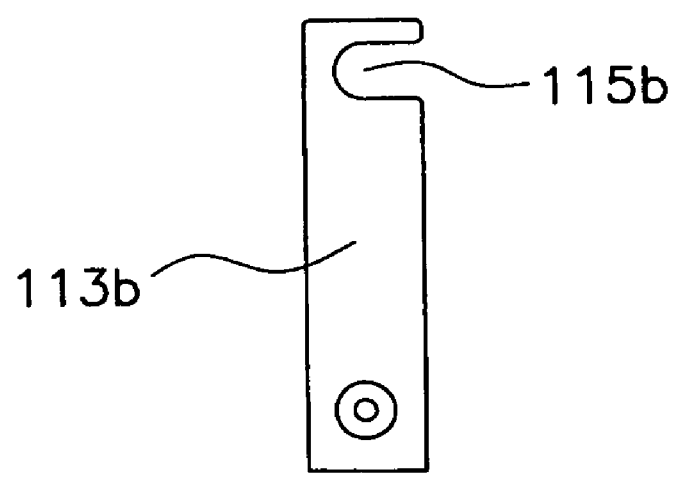

The second links 113*b* are provided at positions on the side surfaces of the motor box 112 backward with respect to the transportation direction as compared with the first links 113*a*. As shown in FIG. 18B, each second link 113*b* has the second recess 115*b* at one (upper) end thereof. The second recess 115*b* is formed to be open forward with respect to the transportation direction in a horizontal direction of the object, i.e., horizontally and inward with respect to the parallel link mechanism 120, and holds the other projection 111*b* of the trough 111 described above.

As shown in FIG. 15, each third link 113*c* is connected to the first link 113*a* and the second link 113*b* at the lower ends thereof. Thus, by swinging the first link 113*a* connected to the link member 116, the second link 113*b* can also be swung. As a result, the entirety of the parallel link 113 can be swung forward and backward with respect to the transportation direction.

Figure 17:
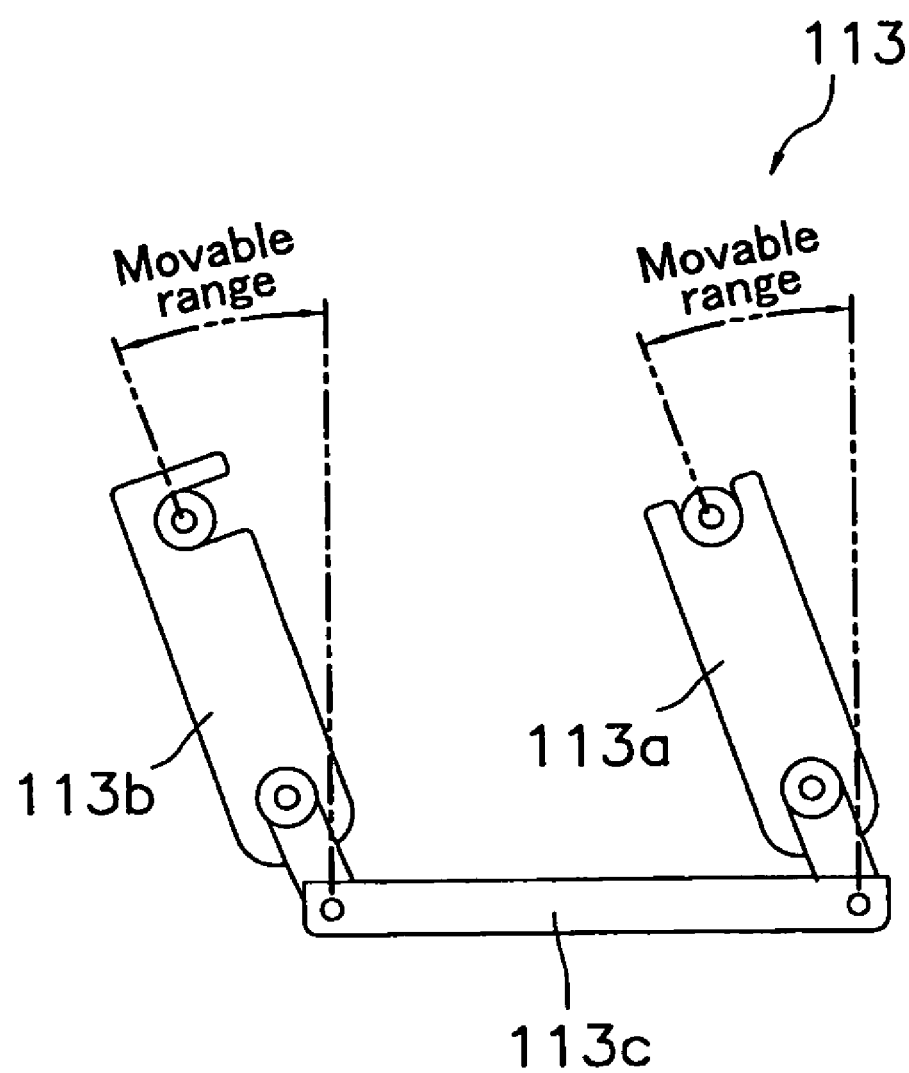
FIG. 17 is a front view of a movable range of a parallel link included in the transportation device shown in FIG. 15.

As shown in FIG. 17, the first link 113*a* and the second link 113*b* each pivot around the coupling point with the side surface of the motor box 112 as the pivoting center, and swing forward and backward with respect to the transportation direction in a range between a position at which the links 113*a* and 113*b* are inclined backward with respect to the transportation direction (second state) and a position at which the links 113*a* and 113*b* are parallel to the vertical direction (first state). By reciprocating the trough 111 such that the movable range of the parallel link 113 includes a rear area with respect to the transportation direction in this manner, the object on the trough 111 is supplied with a force of throwing the object obliquely upward from the trough 111 forward with respect to the transportation direction. Therefore, the object which is being transported is gradually transported forward with respect to the transportation direction so as to be thrown obliquely upward from the trough 111.

The parallel link 113 is attached to the trough 111 at a position backward with respect to the transportation direction, i.e., backward from the center of the trough 111.

Link Members 116

As shown in FIG. 15, one end of link member 116 is pivotably connected to the parallel link 113 (the first link 113*a* and the link member 116), and the other end of each link member 116 is pivotably connected to the projection 114*b* of the disc member 114*a* of the rotatable motor 114. When the rotatable motor 114 starts rotating, the disc member 114*a* rotates. The link member 116 connected to the projection 114b of the disc member 114a is secured so as to be pivotable around the projection 114b as the pivoting center. Therefore, the link member 116 can cause, by the rotation of the rotatable motor 114, the parallel link 113 (the first link 113a) connected to the other end of the link member 116 to swing forward and backward, around the connection point with the motor box 112 as the pivoting center.

As described above, with the transportation device 110 in this embodiment, a rotation driving force of the rotatable motor 114 is conveyed to the parallel link 113 via the link member 116, not directly to the parallel link 113. Thus, the trough 111 can be reciprocated by rotating the rotatable motor 114 in one direction, with no need to rotate the rotatable motor 114 forward and backward.

Description of the Operation of the Transportation Device 110

Now, a process of transporting an object by the transportation device 110 in this embodiment will be described.

First, when the user inputs an instruction to start the transportation, the control unit 130 starts the rotation of the rotatable motor 114 of the parallel link mechanism 120. A rotation driving force from the rotatable motor 114 is conveyed to the parallel link 113 (the first links 113a) via the link members 116 and thus swings the parallel link 113 forward and backward within a vertical plane which is parallel to the transportation direction. Since the parallel link 113 which is being swung is connected to the projections 111a and 111b projecting from the bottom surface of the trough 111, the trough 111 can be reciprocated forward and backward with respect to the transportation direction.

The parallel link 113 for reciprocating the trough 111 forward and backward with respect to the transportation direction swings forward and backward in the movable range shown in FIG. 17, with the connection point between each first link 113a and the corresponding third link 113c and the connection point between each second link 113b and the corresponding third link 113c being the pivoting centers. More specifically, the first and second links 113a and 113b swing forward and backward repeatedly between the first state where the links 113a and 113b are parallel to the vertical direction and the second state where the links 113a and 113b are inclined backward with respect to the transportation direction. By swinging the first and second links 113a and 113b forward and backward in a rear area with respect to the transportation direction in this manner, the trough 111 can be reciprocated so as to throw an object on the trough 111 obliquely upward forward with respect to the transportation direction. As a result, the object on the trough 111 can be supplied with a force directed obliquely upward. Therefore, for example, even an object having a sticky surface or an object absorbing vibration can be smoothly transported.

In addition, in this embodiment, as shown in FIG. 15 and FIG. 16, the trough 111 reciprocating forward and backward with respect to the transportation direction is inclined down and forward with respect to the transportation direction as described above. The projections 118 are formed on the transportation surface of the trough 111. The projections 118 each include the first face 118a and the second face 118b. The first face 118a is formed at a position forward with respect to the transportation direction, whereas the second face 118b is formed at a position backward with respect to the transportation direction. As shown in FIG. 19, the first face 118a is formed to have a greater inclination angle with respect to the transportation surface of the trough 111 than the second face 118b (inclination angle D1>inclination angle D2). Therefore, the first face 118a can suppress the object which is being transported from moving backward with respect to the transportation direction while the trough 111 is reciprocating with respect to the transportation direction. The second face 118b can suppress the problem that the object which is being transported slides down along the transportation surface at a velocity higher than necessary due to the downward inclination of the trough 111 directed forward with respect to the transportation direction. Thus, by combining (i) the downward inclination of the trough 111 directed forward with respect to the transportation direction and (ii) formation of the projections 118 on the trough 111, even an object having a sticky surface, an object absorbing vibration, or the like can be smoothly transported without being transported at a velocity higher than necessary.

As described above, the reciprocation of the trough 111 is controlled by the control unit 130 such that the trough 111 moves forward and backward with respect to the transportation direction at an equal velocity. Thus, an object can be transported in the state in which the load on the driving unit (rotatable motor 114) is reduced, and the controlling load on the control unit 30 can be alleviated as compared with the case where the trough 111 is controlled to move forward and backward with respect to the transportation direction at different velocities. In addition, the trough 111 is moved intermittently, i.e., is stopped for a predetermined time period each time the trough 111 reciprocates forward and backward with respect to the transportation direction. Therefore, the number of times that the trough 111 is reciprocated can be reduced and an object can be transported more efficiently as compared with the case where the trough 111 is controlled to be continuously reciprocated.

Features of the Transportation Device 110 in this Embodiment (1)

As shown in FIG. 15, the transportation device 110 in this embodiment transports an object placed on the trough 111 in a predetermined direction by reciprocating the trough 111 by the parallel link mechanism 120. The trough 111 is inclined down and forward with respect to the transportation direction. As shown in FIG. 16, the trough 111 has the projections 118, each including the first face 118a and the second face 118b, formed on the transportation surface thereof. As shown in FIG. 19, the inclination angle D1 of the first face 118a with respect to the transportation surface is greater than the inclination angle D2 of the second face 118b with respect to the transportation surface.

Therefore, for example, even an object to be transported having a sticky surface or an object absorbing vibration, which is usually difficult to be transported, can be smoothly transported owing to the downward inclination of the trough 111 and the suppression of the object from moving backward with respect to the transportation direction by the first face 118a. Moreover, even though the trough 111 is inclined down and forward with respect to the transportation direction, the second face 118b can prevent the problems, for example, that the object is transported at a velocity higher than necessary and that the object slides down when the trough 111 stops reciprocating. As a result, satisfactory transportation can be provided regardless of the type of the object by combining (i) the downward inclination of the trough 111 directed forward with respect to the transportation direction and (ii) the first face 118a and the second face 118b of the projections 118 formed on the transportation surface of the trough 111.

(2)

In the transportation device 110 in this embodiment, the parallel link mechanism 120 as a reciprocating mechanism for reciprocating the trough 111 in the transportation direction comprises the first and second links 113a and 113b for supporting the trough 111. As shown in FIG. 17, the first and second links 113a and 113b swing forward and backward between the first state where the links 113a and 113b are parallel to the vertical direction and the second state where the links 113a and 113b are inclined backward with respect to the transportation direction.

By swinging the parallel link 113 (the first links 113a and the second links 113b) forward and backward in a range including a rear area with respect to the transportation direction in this manner, the object on the trough 111 can be supplied with a force directed obliquely upward with respect to the transportation direction. As a result, the object on the trough 111 can be transported so as to be thrown obliquely upward with respect to the transportation direction. Therefore, even an object having a sticky surface, an object absorbing vibration, or the like can be smoothly transported.

(3)

With the transportation device 110 in this embodiment, the control unit 130 controls the rotation driving of the rotatable motor 114 such that the trough 111 moves forward and backward with respect to the transportation direction at an equal velocity.

Thus, the torque of the rotatable motor 114 can be reduced to allow a motor having a smaller volume to be used, and the driving controlling load on the control unit 130 can be alleviated as compared with, for example, a mechanism for moving the trough 111 forward and backward with respect to the transportation direction at different velocities such as the fast backward transportation mechanism or the like.

(4)

With the transportation device 110 in this embodiment, the control unit 130 performs so-called intermittent driving of stopping the trough 111 in a predetermined time period each time the trough 111 reciprocates forward and backward with respect to the transportation direction.

Thus, the rotation frequency of the rotatable motor 114 can be reduced and the object can be transported more efficiently as compared with the case where the trough 111 is continuously reciprocated.

Example 2

Now, with reference to FIG. 25 through FIG. 27, test results on the transportation performance of the transportation device 110 described in Embodiment 4 will be described. In the transportation device 110, the downward inclination of the trough 111 and the projections 118 on the transportation surface of the trough 111 are combined.

A transportation performance confirmation test was performed regarding the transportation distance of 200 mm, using chicken meat as the object to be transported, under the condition that the trough 111 is transported forward and backward with respect to the transportation direction at an equal velocity (1200 pps). The test was performed on whether the trough 111 should be inclined or not, whether the trough 111 should have the projections 118 on the transportation surface thereof or not, and whether the first and second links 113a and 113b should be movable in a range so as to move the object horizontally or so as to throw the object upward (movable backward).

First, the results on whether the trough 111 should be inclined or not will be described. Comparing the test results in shown in FIG. 25 with no downward inclination and the results shown in FIG. 26 with downward inclination, it was found that the transportation time of chicken meat is significantly reduced in the test results in which the trough 111 is inclined downward, as opposed to the case where the trough 111 is flat (with no downward inclination). For example, comparing the test results in the case where the transportation surface is flat (with no projections), the transportation time is 10 seconds or longer with no downward inclination (FIG. 25), but is reduced to 4 seconds or shorter with downward inclination (FIG. 26). From this, it was found that the transportation time can be reduced by inclining the transportation surface of the trough 111 down and forward with respect to the transportation direction.

Next, the results on whether the transportation surface of the trough 111 should have projections 118 or not will be described. It is clear from the test results in FIG. 25 and FIG. 26 that the transportation time can be significantly reduced by forming the projections 118 on the transportation surface of the trough 111. For example, as shown by the test results in FIG. 25, the transportation time is 10 seconds or longer with the flat transportation surface (with no projections), but is reduced to about 1 second with the projections 118. Similarly as shown by the test results in FIG. 26, the transportation time is 3 seconds or longer with the flat transportation surface (with no projections), but is reduced to about 1 second with the projections. Thus, it was found that the transportation time can be reduced by forming the projections 118 on the transportation surface of the trough 111.

Figure 26:
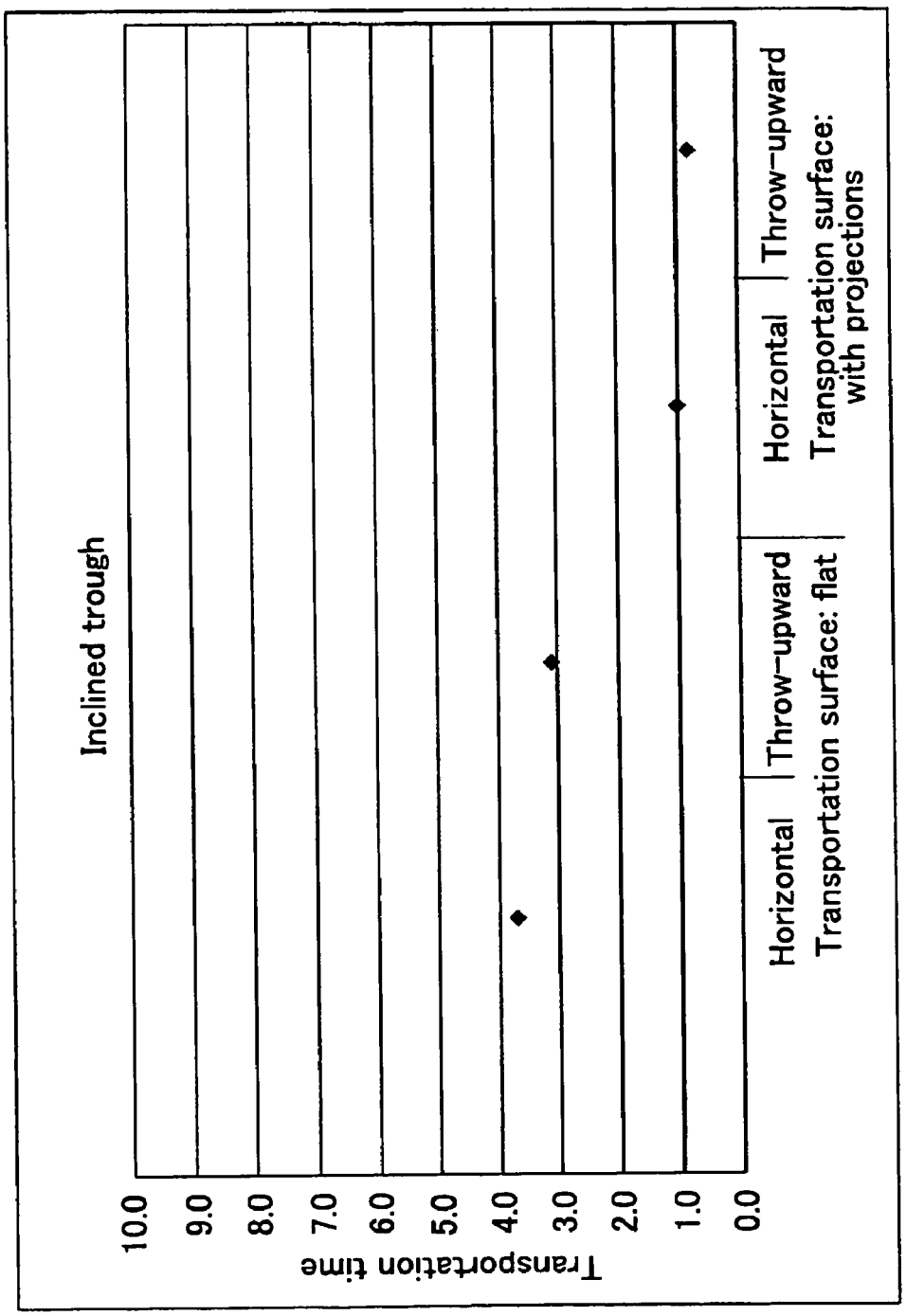
FIG. 26 is a graph illustrating confirmation test results showing the transportation performance of the transportation devices according to the present invention.

In the case where the projections 118 are formed on the transportation surface and the trough 111 is inclined downward, the transportation time can be reduced to 1 second or shorter as shown in FIG. 26.

As shown in FIG. 27, when the angle of the downward inclination of the trough 111 is increased to 7 degrees and to 13 degrees, the rotation frequency of the rotatable motor 114 required to fulfill the specifications can be reduced from 450 rpm to 350 rpm to 250 rpm. It was found from this that by attaching the trough 111 at an appropriate inclination angle in accordance with the property of the object to be transported so as not to excessively increase the transportation velocity, the load on the rotatable motor 114 for reciprocating the trough 111 can be alleviated.

Figure 25:
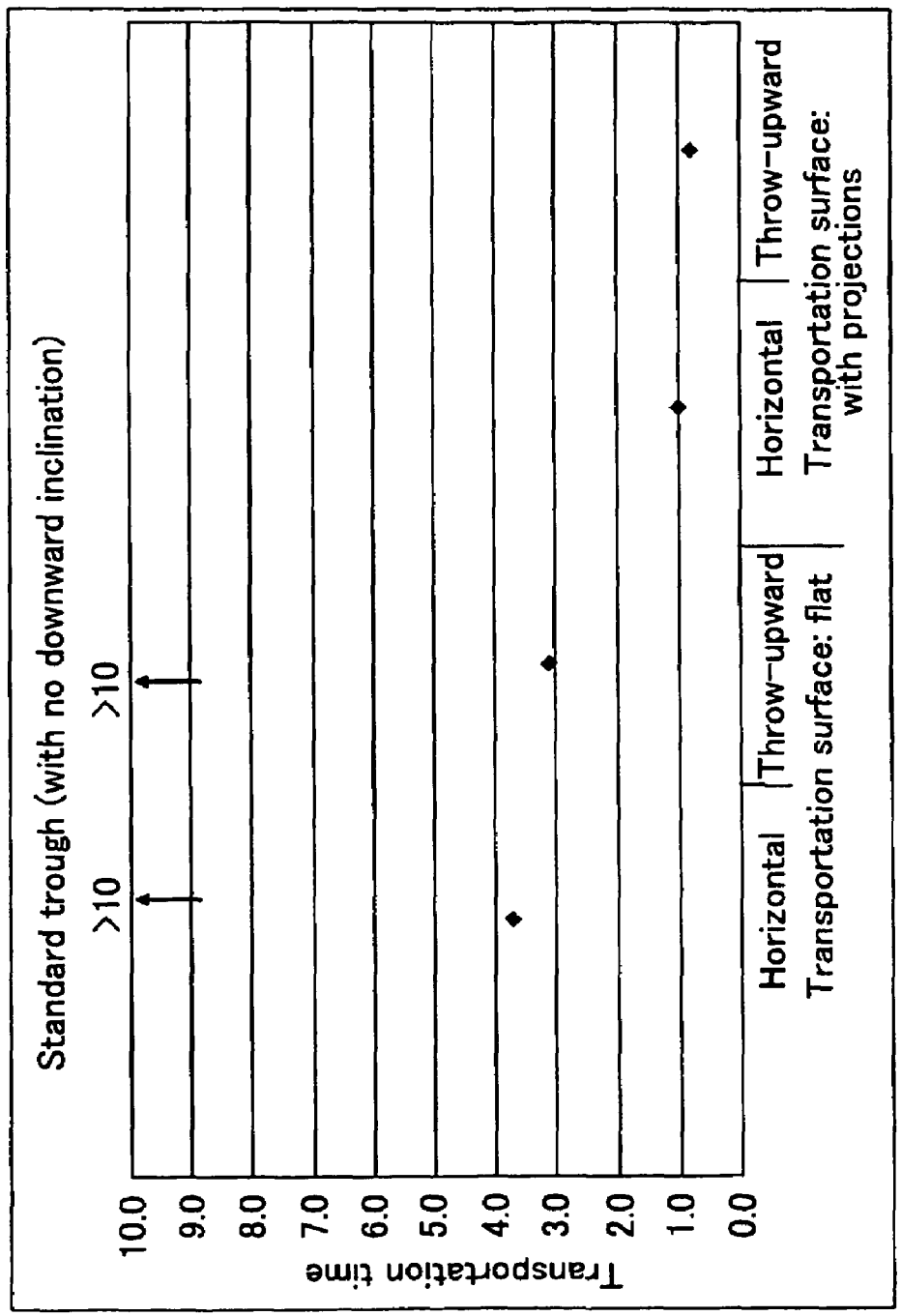
FIG. 25 is a graph illustrating confirmation test results showing the transportation performance of the transportation devices according to the present invention.

As shown by the test results in FIG. 25 and FIG. 26, the transportation time can be slightly reduced by swinging the first and second links 113a and 113b of the parallel link 113 between the state where the links 113a and 113b are inclined backward with respect to the transportation direction (second state) and the state where the links 113a and 113b are parallel to the vertical direction (first state) so as to throw the object upward while being transported. For example, the test results in FIG. 26 show that the transportation time is slightly shorter with the throw-up driving both for the flat transportation surface and for the transportation surface with projections.

Referring to the above-described test results, it was found that the transportation time of an object on the trough 111 can be significantly reduced by inclining the trough 111 down and forward with respect to the transportation direction and forming the projections 118 on the transportation surface of the trough 111. It is also appreciated that the transportation time can be slightly reduced by reciprocating the parallel link 113 in a range including a rear area with respect to the transportation direction such that the object on the trough 111 is thrown upward forward with respect to the transportation direction as compared with reciprocating the trough 111 horizontally.

Embodiment 5

A combinational weighing device including a transportation device according to still another embodiment of the present invention will be described with reference to FIG. 20 and FIG. 21.

Overall Structure of Combinational Weighing Device 150

Figure 20:
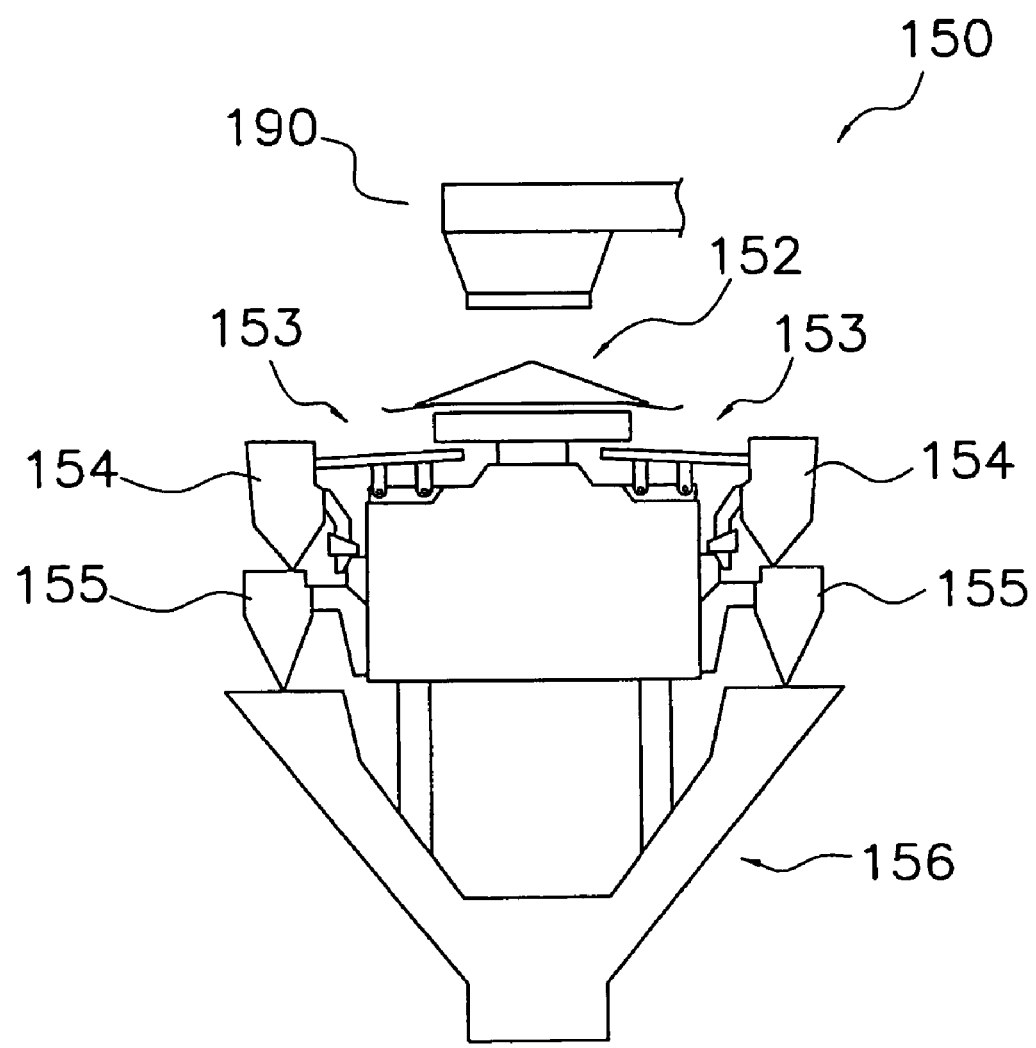
FIG. 20 is a schematic view illustrating the structure of a combinational weighing device according to yet another embodiment of the present invention.

As shown in FIG. 20, a combinational weighing device 150 according to this embodiment performs combinational weighing such that an assembly of objects to be weighed has a predetermined weight or a predetermined number, using measurement values of a plurality of weighing hoppers (weighing unit, discharging unit) 155. The combinational weighing device 150 comprises the transportation devices 110 described in Embodiment 4 as a supply trough group 153. The structure of the supply trough group 153 is substantially the same as that of the transportation device 110 described in Embodiment 4. Therefore, elements thereof bear identical reference numeral thereto and the detailed description of the structure will be omitted.

The combinational weighing device 150 mainly comprises a cone-shaped dispersion table 152 located just below a position to which an object to be weighed (hereinafter, referred to as an "object") is dropped by a supply conveyer device 190 provided at a previous stage, the supply trough group (transportation device) 153 located around the dispersion table 152, a plurality of pool hoppers 154 and weighing hoppers 155, and a collecting and discharging chute 156.

Figure 21:
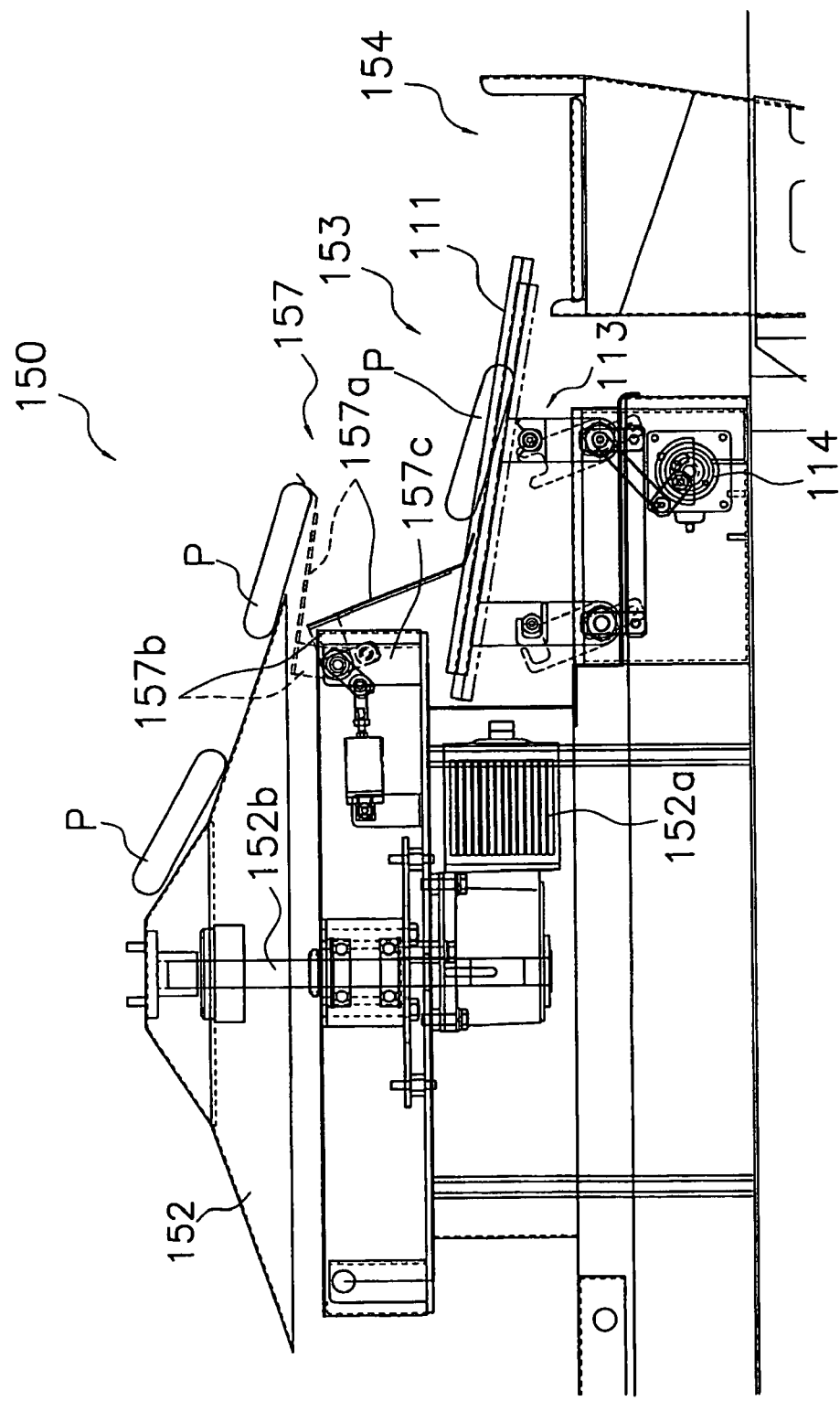
FIG. 21 is a detailed view of a dispersion table and the vicinity thereof of the combinational weighing device shown in FIG. 20.

As shown in FIG. 21, the dispersion table 152 is an umbrella-like circular plate, and is continuously rotated by a driving motor (driving mechanism) 152a. Objects supplied to the top surface of the dispersion table 152 from the supply conveyer device 190 move to the supply trough group 153 while being dispersed by a centrifugal force.

Each trough 111 of the supply trough group 153 transports an object in a transportation direction (outward in a radial direction of a circle having the dispersion table 152 at the center) by a rotation driving force of the rotatable motor 114 (see FIG. 15 and FIG. 21) being conveyed to the trough 111 via the parallel link 113 or the like.

Each pool hopper 154 receives an object from the supply trough group 153, temporarily pools the object, opens an open/close gate provided at a lower position thereof by an instruction of a control unit (not shown), and supplies the object to the corresponding weighing hopper 155.

Each weighing hopper 155 is provided below the corresponding pool hopper 154. A plurality of pool hoppers 154 and weighing hoppers 155 are provided along a circumferential direction in correspondence with the troughs 111. Each weighing hopper 155 has a load cell (not shown) for weighing the object therein. Each weighing hopper 155 also has an open/close gate (not shown) at a lower position thereof for throwing the object to the collecting and discharging chute 156 in order to allow the weighing hopper 155 to act as a discharging unit.

The collecting and discharging chute 156 collects the objects thrown from the weighing hoppers 155 and flows the objects down to a device at a subsequent stage, such as a packaging device or the like.

Structure of the Dispersion Table 152

The dispersion table 152 is located at the center of the supply trough group 153 located circumferentially, and upstream with respect to, and immediately adjacent to, the supply trough group 153. The dispersion table 152 transports objects supplied from the supply conveyer device 190 toward the supply trough group 153.

The dispersion table 152 receives a rotation driving force from the driving motor (driving mechanism) 152a to continuously rotate in a horizontal direction (see FIG. 21). More specifically, the rotation driving force of the driving motor 152a is conveyed to a support unit 152b for supporting the dispersion table 152 via a plurality of gears (not shown), and therefore the dispersion table 152 connected to the supporting unit 152b is rotated in the horizontal direction. Thus, a centrifugal force can be applied to the objects supplied onto the dispersion table 152, and the objects can be transported substantially uniformly to a plurality of troughs 111 in the supply trough group 153 located so as to surround the dispersion table 152.

As shown in FIG. 21, a plurality of shutter mechanisms 157 in correspondence with the supply trough group 153 are provided along an outer circumference of the generally circular dispersion table 152. In each shutter mechanism 157, a shutter unit 157a is closed in a usual state to temporarily stop the transportation of an object P, and is opened when the supply trough group 153 or the pool hopper 154 becomes empty to supply the object P to the supply trough group 153. In this manner, the objects P are, for example, transported one by one to the supply trough group 153 or the pool hopper 154. Each shutter mechanism 157 comprises the shutter unit 157a, a pivotable unit 157b, and a driving unit 157c.

The shutter unit 157a is a tray-like member for receiving an object P transported from the dispersion table 152. The shutter unit 157a is pivoted around a pivoting center provided at the pivoting unit 157b, obliquely downward from an approximately horizontal state, and thus transfers from the state of temporarily stopping the transportation of the object P to a state of supplying the object P. In this manner, the shutter unit 157a adjusts the timing for transporting the object P to the supply trough group 153.

The pivoting unit 157b is coupled to a rear end of the shutter unit 157a (on the dispersion table 152 side), and pivots around the pivoting center pivotably connected to the driving unit 157c so as to switch the open state/close state of the shutter unit 157a.

The driving unit 157c has a cylinder and a link (not shown) therein. The driving unit 157c conveys a horizontal driving of the cylinder to the pivoting unit 157b via the link to open or close the shutter unit 157a.

Features of the Combinational Weighing Device 150

(1)

As shown in FIG. 20, the combinational weighing device 150 in this embodiment comprises a plurality of transportation devices 110 described above in Embodiment 4 as the supply trough group 153 in addition to the dispersion table 152, the pool hoppers 154, and the weighing hoppers 155.

Thus, even when the object to be transported has a sticky surface or absorbs vibration (e.g., pickles, chicken meat, etc.), such an object can be smoothly transported to the pool hopper 154 provided at a downstream position without being transported at an excessively high velocity.

(2)

As shown in FIG. 21, the combinational weighing device 150 in this embodiment comprises the generally umbrella-like dispersion table 152 upstream with respect to the supply trough group 153 as a transportation device. By rotating the dispersion table 152, objects P are transported from the rotation center of the dispersion table 152 to radially outward.

Thus, the objects P on the dispersion table 152 can be supplied with a centrifugal force and can be transported toward the outer circumference of the dispersion table 152.

(3)

With the combinational weighing device 150 in this embodiment, the dispersion table 152 is rotated in a horizontal plane, and thus objects P placed on the dispersion table 152 are transported toward the outer circumference thereof.

Thus, the objects P can be transported substantially uniformly to a plurality of troughs in the supply trough group 153 located around the dispersion table 152.

(4)

As shown in FIG. 21, the combinational weighing device 150 in this embodiment comprises the shutter mechanisms 157 provided between the outer circumference of the dispersion table 152 and the pool hopper 154.

Thus, by opening or closing the shutter unit 157a of each shutter mechanism 157, the timing at which the supply trough group 153, which has received an object P from the dispersion table 152, supplies the object P to the pool hopper 154 can be controlled. Therefore, the combinational weighing device 150 can be used in the case where it is necessary to supply the objects P one by one to the pool hopper 154 and the weighing hopper 155.

Other Embodiments

The present invention has been described by way of embodiments. The present invention is not limited to the above-described embodiments, and various modifications can be made without departing from the scope of the present invention.

(A)

In the above embodiments, the reciprocation of the trough 111 is realized by the parallel link mechanism 120. The present invention is not limited to this, and the reciprocation of the trough 111 may be realized by other transportation mechanisms.

(B)

In Embodiment 4, the trough 111 is reciprocated at an equal velocity. The present invention is not limited to this.

Substantially the same effect as described above can be provided in the case where, for example, the trough 111 is moved forward at a higher velocity than backward or is moved backward at a higher velocity than forward. A type of driving to provide appropriate transportation for the reciprocation of the trough 111 can be determined in consideration of the properties of the object to be transported or the like.

(C)

In Embodiment 4, the trough 111 is reciprocated intermittently. The present invention is not limited to this.

Substantially the same effect as described above can be provided in the case where, for example, the trough 111 is continuously reciprocated.

(D)

In Embodiment 4, as shown in FIG. 17, the movable range of the parallel link 113 (the first links 113a, the second links 113b) is between a position at which the first and second links are parallel to the vertical direction and a position at which the first and second links are inclined backward with respect to the transportation direction. The present invention is not limited to this.

For example, (the parallel link 113 may be reciprocated in a range including a position at which the first and second links are inclined forward with respect to the transportation direction. In this case also, an area included in the movable range in which the first links 113a and the second links 113b are inclined backward with respect to the transportation direction is larger than an area in which the links 113a and 113b are inclined forward with respect to the transportation direction. Therefore, the object can be transported so as to be thrown upward.

(E)

In Embodiment 5, the object is transported by continuously rotating the dispersion table 152 at a predetermined velocity. The present invention is not limited to this.

Figure 22:
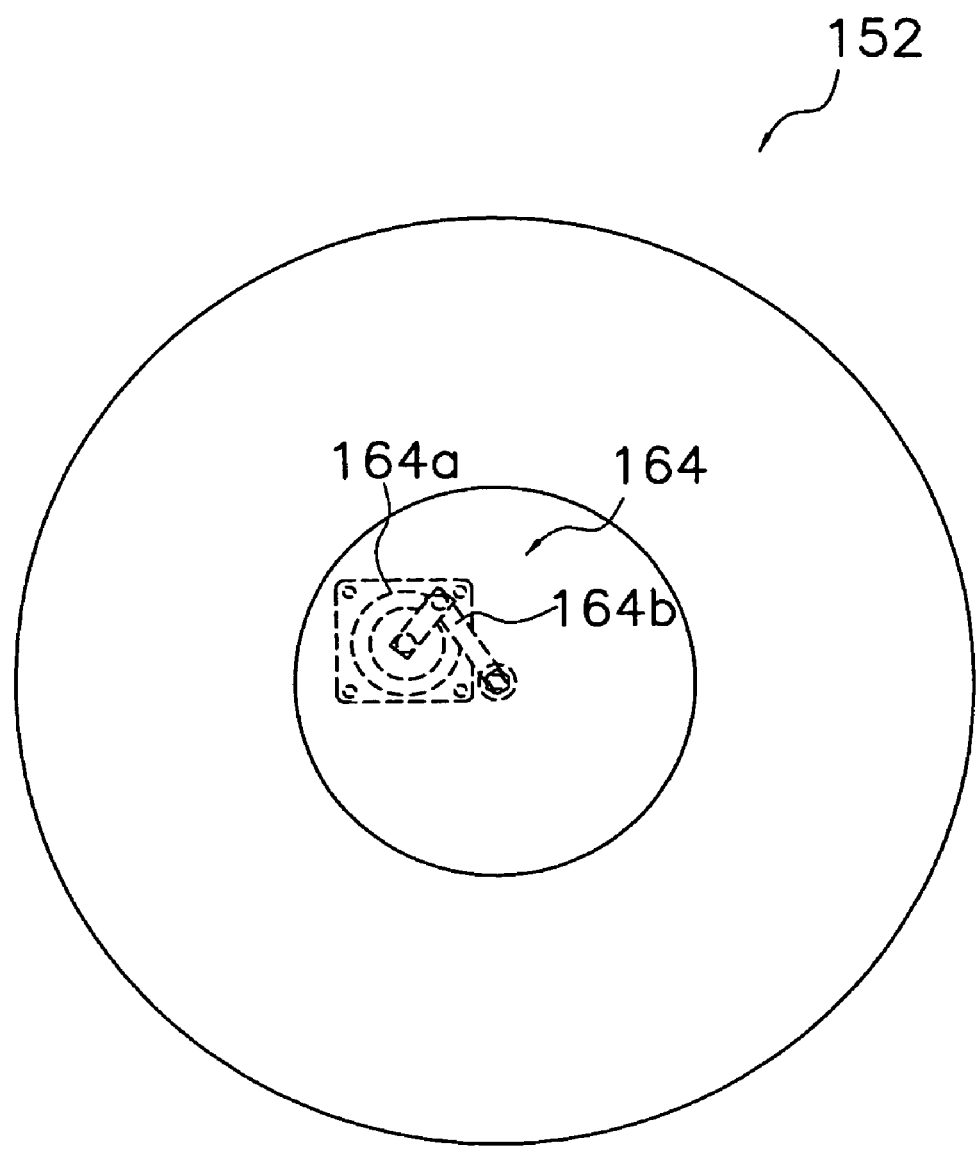
FIG. 22 is a plan view of a driving mechanism for swinging a dispersion table included in a combinational weighing device according to still another embodiment of the present invention.

For example, as shown in FIG. 22, a driving mechanism 164 having a driving motor 164a and a link mechanism 164b may be used to alternately switch the rotation direction of the dispersion table 152 so as to apply a centrifugal force to the object. Alternatively, a centrifugal force may be applied to the object by intermittent rotating instead of continuous rotating.

(F)

In Embodiment 5, the dispersion table 152 is approximately cone-shaped. The present invention is not limited to this.

Figure 23A:
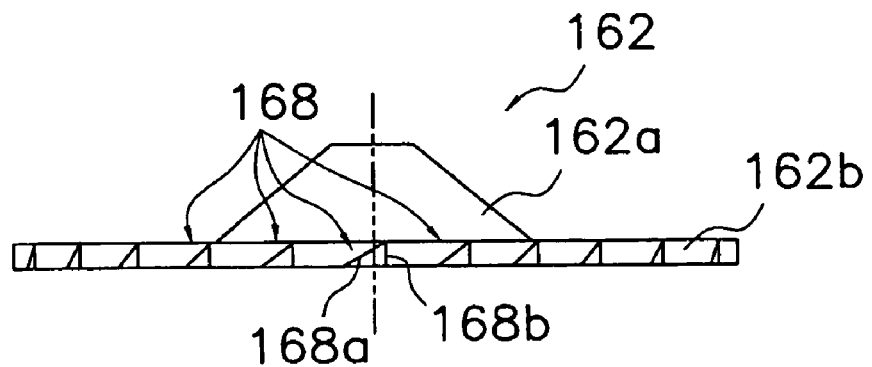
FIG. 23A and FIG. 23B are respectively a side view and a plan view of a dispersion table included in a combinational weighing device according to still another embodiment of the present invention.
Figure 23B:
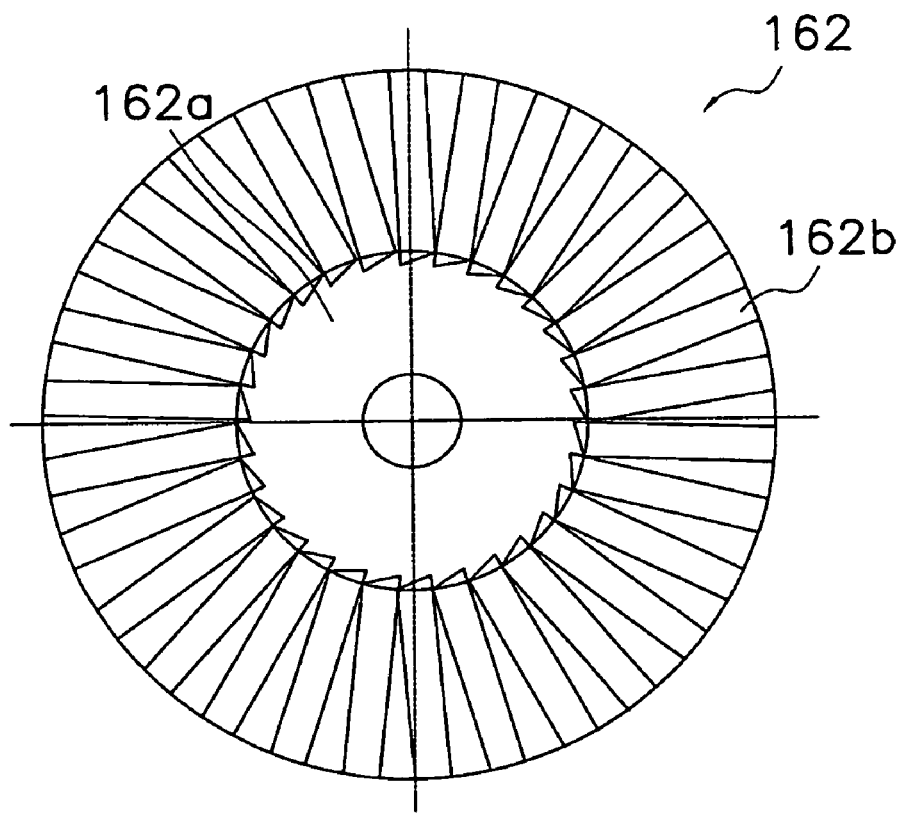

For example, as shown in FIG. 23, a dispersion table 162 may be used, which includes a cone-shaped head portion 162a and a donut-shaped member 162b. The donut-shaped member 162b is attached to the circumference of the cone-shaped head portion 162a extending in a horizontal direction.

(G)

In Embodiment 5, the dispersion table 152 has nothing formed on a transportation surface thereof. The present invention is not limited to this.

For example, as shown in FIG. 23, the dispersion table 162 having projections 168 projecting from the transportation surface thereof may be used. Like the projections 118 described above in Embodiment 4, the projections 168 each have a first face 168a and a second face 168b, and are formed such that the inclination angle of the first face 168a with respect to the transportation surface is greater than the inclination angle of the second face 168b.

Figure 24:
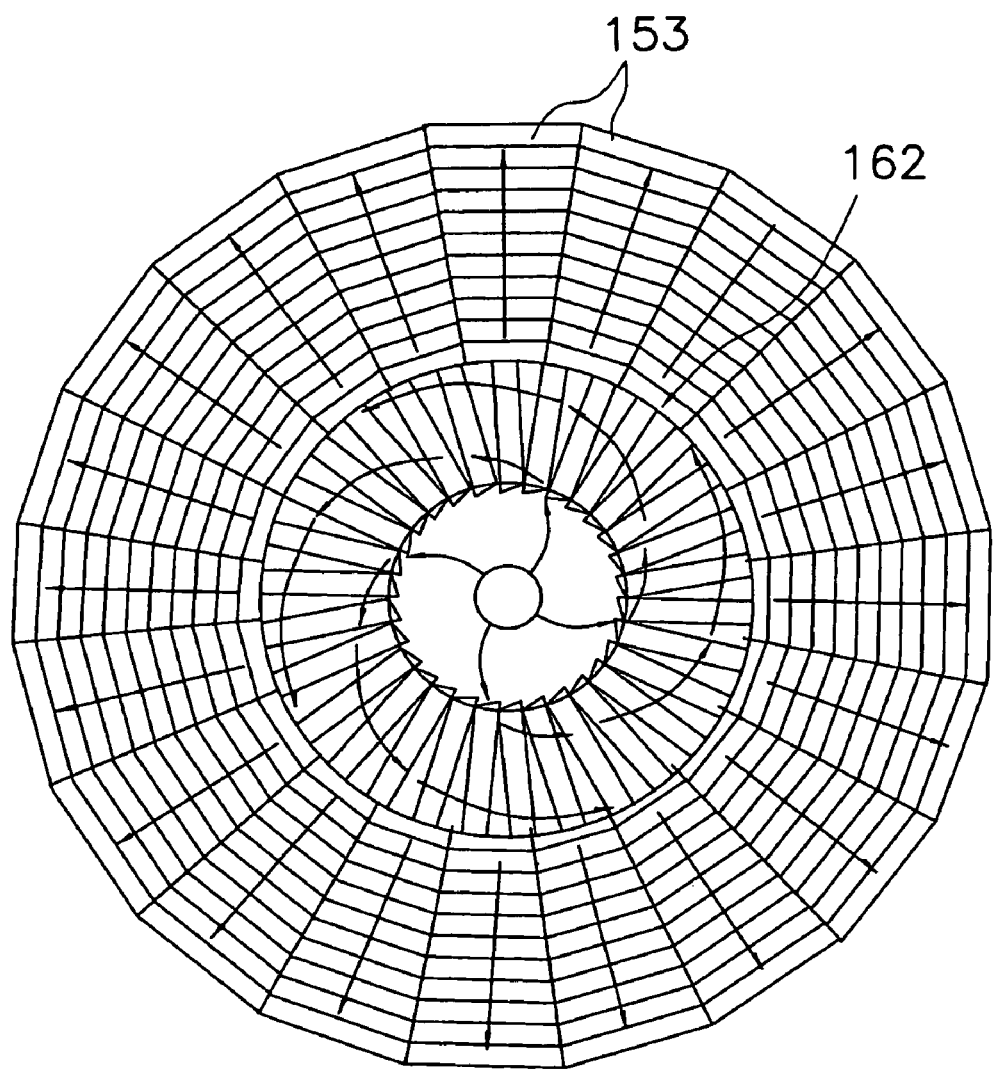
FIG. 24 is a side view and a plan view showing a transportation direction of an object from the dispersion table shown in FIG. 23.

Therefore, in a situation in which the dispersion table 162 is swung in a horizontal plane while the rotation direction thereof is switched at a predetermined rotation angle by the driving mechanism 164 that is shown in FIG. 22, the first face 168a suppresses the object on the dispersion table 162 from moving backward with respect to a transportation direction (the circumferential direction around the rotation center of the dispersion table 162; see FIG. 24), like in the case of the projections 118 in Embodiment 4. For this reason, the object can be smoothly transported forward with respect to the transportation direction.

In this case, the objects on the dispersion table 162 are dispersed in the direction of the arrow in FIG. 24. Namely, the objects on the dispersion table 162 move radially outward by a centrifugal force while sliding in the circumferential direction on the dispersion table 162 by the swinging of the dispersion table 162. Therefore, the transportation direction on the dispersion table 162 is a direction along the circumference around the rotation center of the dispersion table 162. For this reason, on the dispersion table 162 swung in a horizontal direction by the driving mechanism 164 shown in FIG. 22, the first face 168a and the second face 168b of each projection 168 can be arranged along a direction that is intended to be the transportation direction.

(H)

In Embodiment 5, the shutter mechanisms 157 are provided along the outer circumference of the dispersion table 152. The present invention is not limited to this.

Substantially the same effect as described above can be provided, for example, without the shutter mechanisms 157. Notably, though, provision of the shutter mechanisms 157 as in Embodiment 5 allows the combinational weighing device to be used in a situation in which, for example, it is necessary to put objects such as chicken meat one by one into the weighing hopper.

INDUSTRIAL APPLICABILITY

A transportation device according to the present invention provides an effect of smoothly transporting even an object, which is difficult to be transported by a conventional transportation device, in a predetermined transportation direction, and is widely applicable to various apparatuses including a transportation device or supply device for transporting objects while reciprocating a trough.

What is claimed is:

1. A transportation device comprising:
    a trough on which an object to be transported is to be placed;
    a reciprocating mechanism configured to reciprocate the trough forward and backward with respect to a transportation direction of the object, the reciprocating mechanism including a plurality of vertical members coupled to the trough; and
    a control unit configured to control the reciprocating mechanism so as to pivot the vertical members to move the trough forward at a higher velocity than backward;
    wherein the trough is reciprocated forward in a diagonally upward direction by pivoting the vertical members of the reciprocating mechanism.

2. A transportation device according to claim 1, wherein the reciprocating mechanism is a parallel link mechanism comprising the vertical members configured to support the trough, a drive source configured to reciprocate the trough, and a link member configured to couple the vertical members and the drive source.

3. A transportation device according to claim 2, wherein the parallel link mechanism is installed to the rear of the trough in the transportation direction of the object.

4. A transportation device according to claim 1, wherein the control unit controls the reciprocating mechanism such that the trough moves intermittently each time the trough reciprocates forward and backward with respect to the transportation direction and such that the trough will be stationary in a rear end area with respect to transportation direction.

5. A transportation device according to claim 1, further comprising a projection formed on a transportation surface of the trough, wherein a face of the projection located at a forward position with respect to the transportation direction is inclined at a greater angle to the transportation surface than a face of the projection located at a backward position with respect to the transportation direction.

6. A transportation device according to claim 1, wherein the transportation surface of the trough is inclined down and forward with respect to the transportation direction.

7. A transportation device according to claim 1, wherein the object to be transported is an object having a sticky surface or an object absorbing vibration.

8. A combinational weighing device comprising:
    a transportation device according to claim 1;
    a weighing unit configured to weigh an object supplied from the transportation device; and
    a discharging unit configured to discharge the weighed object.

9. A transportation device according to claim 1, wherein the transportation surface of the trough is inclined down and forward with respect to the transportation direction, the transportation device further comprising:
    a driving unit configured to drive the reciprocating mechanism; and
    a projection formed on the transportation surface of the trough, wherein a face of the projection located at a forward position with respect to the transportation direction is inclined at a greater angle to the transportation surface than a face of the projection located at a backward position with respect to the transportation direction.

10. A transportation device according to claim 9, wherein:
    the vertical members reciprocate in a range between a first state in which the vertical members are parallel to the vertical direction and a second state in which the vertical members are inclined backward with respect to the transportation direction.

11. A transportation device according to claim 9, further comprising a generally circular dispersion table located upstream with respect to the trough and swung so as to disperse objects placed thereon from a center thereof, and a driving mechanism configured to swing the dispersion table.

12. A transportation device according to claim 11, wherein the dispersion table has a projection on a circumferential area of a surface thereof on which the objects are to be placed, wherein a face of the projection located at a forward position with respect to a transportation direction on the dispersion table is inclined at a greater angle to the transportation surface than a face of the projection located at a backward position with respect to the transportation direction.

13. A transportation device according to claim 11, wherein the dispersion table is swung in a horizontal direction by the driving mechanism.

14. A transportation device according to claim 11, further comprising a shutter mechanism, located between a circumferential end of the dispersion table and the trough, the shutter mechanism configured to temporarily stop transportation of the object.

15. A combinational weighing device, comprising:
    a transportation device according to claim 9;
    a weighing unit configured to weigh an object supplied from the transportation device; and
    a discharging unit configured to discharge the weighed object.

* * * * *